(12) United States Patent
Sato et al.

(10) Patent No.: US 12,405,561 B2
(45) Date of Patent: Sep. 2, 2025

(54) PRESS-BONDED SHEET MANUFACTURING METHOD, PRESS-BONDED SHEET MANUFACTURING APPARATUS, AND IMAGE FORMING APPARATUS

(71) Applicant: CANON KABUSHIKI KAISHA, Tokyo (JP)

(72) Inventors: Shun Sato, Kanagawa (JP); Kohei Matsuda, Kanagawa (JP); Kentaro Kawata, Shizuoka (JP); Taku Watanabe, Shizuoka (JP); Atsushi Toda, Shizuoka (JP); Hiraku Sasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/620,777

(22) Filed: Mar. 28, 2024

(65) Prior Publication Data

US 2024/0241472 A1 Jul. 18, 2024

Related U.S. Application Data

(63) Continuation of application No. PCT/JP2022/035821, filed on Sep. 27, 2022.

(30) Foreign Application Priority Data

Sep. 30, 2021 (JP) ................................ 2021-160247
Sep. 16, 2022 (JP) ................................ 2022-147742

(51) Int. Cl.
*G03G 15/00* (2006.01)
*G03G 9/08* (2006.01)
(Continued)

(52) U.S. Cl.
CPC ....... *G03G 15/6588* (2013.01); *G03G 9/0821* (2013.01); *G03G 9/08726* (2013.01);
(Continued)

(58) Field of Classification Search
CPC ............. G03G 15/6588; G03G 9/0821; G03G 9/08726; G03G 9/08755; G03G 15/2064;
(Continued)

(56) References Cited

U.S. PATENT DOCUMENTS

| | | | |
|---|---|---|---|
| 2006/0133871 A1* | 6/2006 | Ishida | G03G 15/2064 399/341 |
| 2021/0016587 A1* | 1/2021 | Iida | G03G 15/6544 |
| 2021/0294228 A1* | 9/2021 | Emura | G03G 15/6585 |

FOREIGN PATENT DOCUMENTS

| | | | |
|---|---|---|---|
| JP | H09216958 A | 8/1997 | |
| JP | H10226186 A | 8/1998 | |

(Continued)

*Primary Examiner* — Sandra Brase
(74) *Attorney, Agent, or Firm* — Canon U.S.A., Inc. IP Division

(57) ABSTRACT

A press-bonded sheet in which two sheet portions are press-bonded in a peelable state is manufactured by a method including steps of: forming an adhesive layer containing powder adhesive on a sheet; heating the adhesive layer to fix it to the sheet; opposing an area on the sheet where the adhesive layer is fixed and an area on the same sheet or on a different sheet where another adhesive layer is formed and fixed; and press-bonding the opposed areas. The fracture strain of a main constituent material of the powder adhesive is 10% or more and less than 1000%.

12 Claims, 18 Drawing Sheets

(51) Int. Cl.
*G03G 9/087* (2006.01)
*G03G 15/20* (2006.01)

(52) U.S. Cl.
CPC ..... *G03G 9/08755* (2013.01); *G03G 15/2064* (2013.01); *G03G 2215/00514* (2013.01)

(58) Field of Classification Search
CPC ..... G03G 2215/00514; G03G 15/6582; G03G 15/6585; G03G 2215/00822; G03G 2215/00835; G03G 15/6541; G03G 15/6544; G03G 2215/00877; G03G 2215/00789
See application file for complete search history.

(56) References Cited

FOREIGN PATENT DOCUMENTS

| | | |
|---|---|---|
| JP | H1134208 A | 2/1999 |
| JP | 2008030276 A | 2/2008 |
| JP | 2008036957 A | 2/2008 |
| JP | 2008162029 A | 7/2008 |
| JP | 2013166832 A | 8/2013 |
| JP | 2014101471 A | 6/2014 |
| JP | 2021102522 A | 7/2021 |
| JP | 2021160247 A | 10/2021 |
| JP | 2022147742 A | 10/2022 |

\* cited by examiner

PRESS-BONDED SHEET MANUFACTURING METHOD, PRESS-BONDED SHEET MANUFACTURING APPARATUS, AND IMAGE FORMING APPARATUS

CROSS-REFERENCE TO RELATED APPLICATIONS

This application is a Continuation of International Patent Application No. PCT/JP2022/035821, filed Sep. 27, 2022, which claims the benefit of Japanese Patent Application No. 2021-160247, filed Sep. 30, 2021, and Japanese Patent Application No. 2022-147742, filed Sep. 16, 2022, all of which are hereby incorporated by reference herein in their entirety.

BACKGROUND

Field of the Disclosure

The present disclosure relates to a method for manufacturing a press-bonded sheet such as crimped postcards, a press-bonded sheet manufacturing apparatus, and an image forming apparatus.

Description of the Related Art

Conventionally, when creating documents requiring confidentiality and sealing of content such as payroll statements, preprinted paper is prepared in advance, variable data is printed on each piece of preprinted paper, and further, sealing processing is performed as post-processing. In this method, preparation of preprinted paper requiring printing of formats such as ruled lines and application of adhesive takes time.

In addition, it is high cost and inefficient for applications with small required quantities. Japanese Patent Application Laid-Open No. 2008-36957 and Japanese Patent Application Laid-Open No. 2008-162029 propose an envelope-creating device that uses printing toner and resin powder (powder adhesive) having an adhesive function to execute an electrophotographic process, thereby omitting the step of preparing preprinted paper while outputting an envelope-shaped product. In these envelope-creating devices, printing toner and resin powder are transferred to a sheet, then thermally fixed to the sheet, then the sheet is folded, and further, the sheet is pressed while heating to perform a press-bonding process, thereby creating an envelope-shaped product.

However, in the above envelope-creating devices, when peeling the created crimped postcard, if the adhesive strength is too strong, the paper may tear, and if the adhesive strength is unstable, it may fail to peel smoothly. Conventional commercially available crimped postcards peel smoothly and with moderate force, and it cannot be said that such peelability can be reproduced in the crimped postcards reproduced by the above envelope-creating devices. Further, when deformation such as folding occurs in the crimped postcard, there are cases where the adhesive strength after the press-bonding process is lowered. If the adhesive strength between the sheets is lowered due to deformation such as folding in a product such as a crimped postcard that has undergone a press-bonding process, the product may unintentionally open for the user.

Japanese Patent Application Laid-Open No. 2008-36957 and Japanese Patent Application Laid-Open No. 2008-162029 do not describe measures against lowering of adhesive strength due to deformation of the product or peelability (peeling feeling).

SUMMARY

Therefore, the present disclosure provides a method for manufacturing a press-bonded sheet, a press-bonded sheet manufacturing apparatus, and an image forming apparatus capable of peeling a product manufactured by a press-bonding process smoothly and with moderate force, and of suppressing lowering of adhesive strength due to deformation of the product. The present disclosure relates to a method for manufacturing a press-bonded sheet in which sheet portions are press-bonded in a peelable state, comprising: a step of forming an adhesive layer containing powder adhesive on the sheet; a fixing step of heating the adhesive layer formed on the sheet to fix it to the sheet; a step of superimposing by opposing an area on the sheet where the adhesive layer is formed and fixed and an area on the same sheet or on a different sheet where another adhesive layer is formed and fixed; and a press-bonding step of pressurizing the superimposed portion of the areas where the adhesive layer has been formed and fixed under heating and press-bonding it, wherein a fracture strain of a main constituent material of the powder adhesive is 10% or more and less than 1000%.

The present disclosure also relates to a press-bonded sheet manufacturing apparatus for manufacturing a press-bonded sheet in which sheet portions are press-bonded in a peelable state, comprising: means for forming an adhesive layer containing powder adhesive on the sheet; fixing means for heating the adhesive layer formed on the sheet to fix it to the sheet; means for superimposing by opposing an area on the sheet where the adhesive layer is formed and fixed and an area on the same sheet or on a different sheet where another adhesive layer is formed and fixed; and press-bonding means for pressurizing the superimposed portion of the areas where the adhesive layer has been formed and fixed under heating and press-bonding it, wherein a fracture strain of a main constituent material of the powder adhesive is 10% or more and less than 1000%.

Furthermore, the present disclosure relates to an image forming apparatus for manufacturing a press-bonded sheet in which sheet portions are press-bonded in a peelable state, comprising: means for forming a toner image on the sheet using printing toner; means for forming an adhesive layer containing powder adhesive on the sheet; fixing means for heating the toner image and the adhesive layer formed on the sheet to fix them to the sheet; means for superimposing by opposing an area on the sheet where the adhesive layer is formed and fixed and an area on the same sheet or on a different sheet where another adhesive layer is formed and fixed; and press-bonding means for pressurizing the superimposed portion of the areas where the adhesive layer has been formed and fixed under heating and press-bonding it, wherein a fracture strain of a main constituent material of the powder adhesive is 10% or more and less than 1000%.

Further features of the present disclosure will become apparent from the following description of exemplary embodiments with reference to the attached drawings.

DESCRIPTION OF THE EMBODIMENTS

Hereinafter, preferred examples of the present disclosure will be described in detail with reference to the drawings. However, the dimensions, materials, shapes, relative arrangements, etc. of the components described in the present example are not intended to limit the scope of the disclosure to those alone unless otherwise specified. Further, the materials, shapes, etc. of members described once in the following description are the same as those in the initial description unless otherwise specified again.

<Overall Apparatus Configuration>

The steps (or means) that are fundamental for the press-bonded sheet manufacturing method and manufacturing apparatus of the present disclosure for manufacturing a press-bonded sheet in which sheet portions are press-bonded in a peelable state are:

(i) a step of forming an adhesive layer containing powder adhesive on the sheet, (ii) a fixing step of heating the adhesive layer formed on the sheet to fix it to the sheet, (iii) a step of superimposing an area where the adhesive layer is formed on the sheet on which the adhesive layer is fixed and an area on the same sheet or on a different sheet where another adhesive layer is fixed, and (iv) a press-bonding step of pressurizing the superimposed sheets under heating and press-bonding them.

The means fundamental for the image forming apparatus of the present disclosure for manufacturing a press-bonded sheet in which sheet portions are press-bonded in a peelable state are:

(I) means for forming a toner image on the sheet using printing toner, (II) means for forming an adhesive layer containing powder adhesive on the sheet, (III) fixing means for heating the toner image and the adhesive layer formed on the sheet to fix them to the sheet, (IV) means for superimposing an area where the toner image and the adhesive layer are formed on the sheet on which the toner image and the adhesive layer are fixed and an area on the same sheet or on a different sheet where a toner image and an adhesive layer are fixed, and (V) press-bonding means for pressurizing the superimposed sheets under heating and press-bonding them.

Here, in step (iii) and means (IV), when the superimposition is between "different sheets", folding is not necessarily involved, and while it mainly applies to "the same sheet", step (iii) and means (IV) may be conveniently referred to as a "folding unit" or "folding step".

First, the overall configuration of the present disclosure will be described with reference to FIGS. 1, 2, and 6. These show an image forming apparatus having a step of forming a toner image on the sheet using printing toner.

Figure 1:
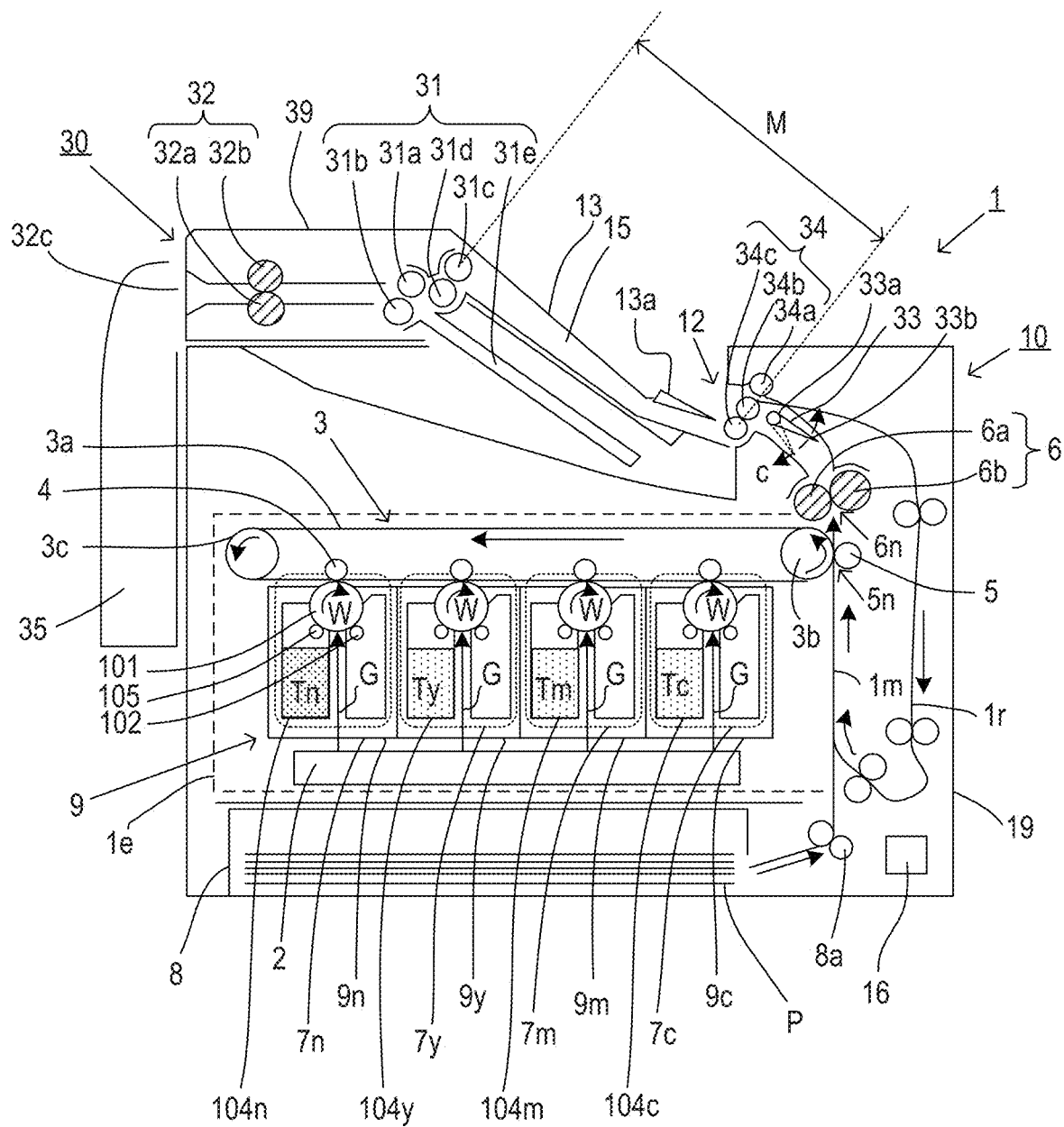
FIG. 1 is a schematic diagram of an image forming apparatus suitable for the present disclosure.

FIG. 1 is a schematic diagram showing a cross-sectional configuration of an image forming apparatus 1 including an image forming apparatus main body (hereinafter referred to as apparatus main body 10) and a post-processing unit 30 connected to the apparatus main body 10. The image forming apparatus 1 is an electrophotographic image forming apparatus (electrophotographic system) constituted by an apparatus main body 10 having an electrophotographic printing mechanism and a post-processing unit 30 as a sheet processing device.

Figure 6:
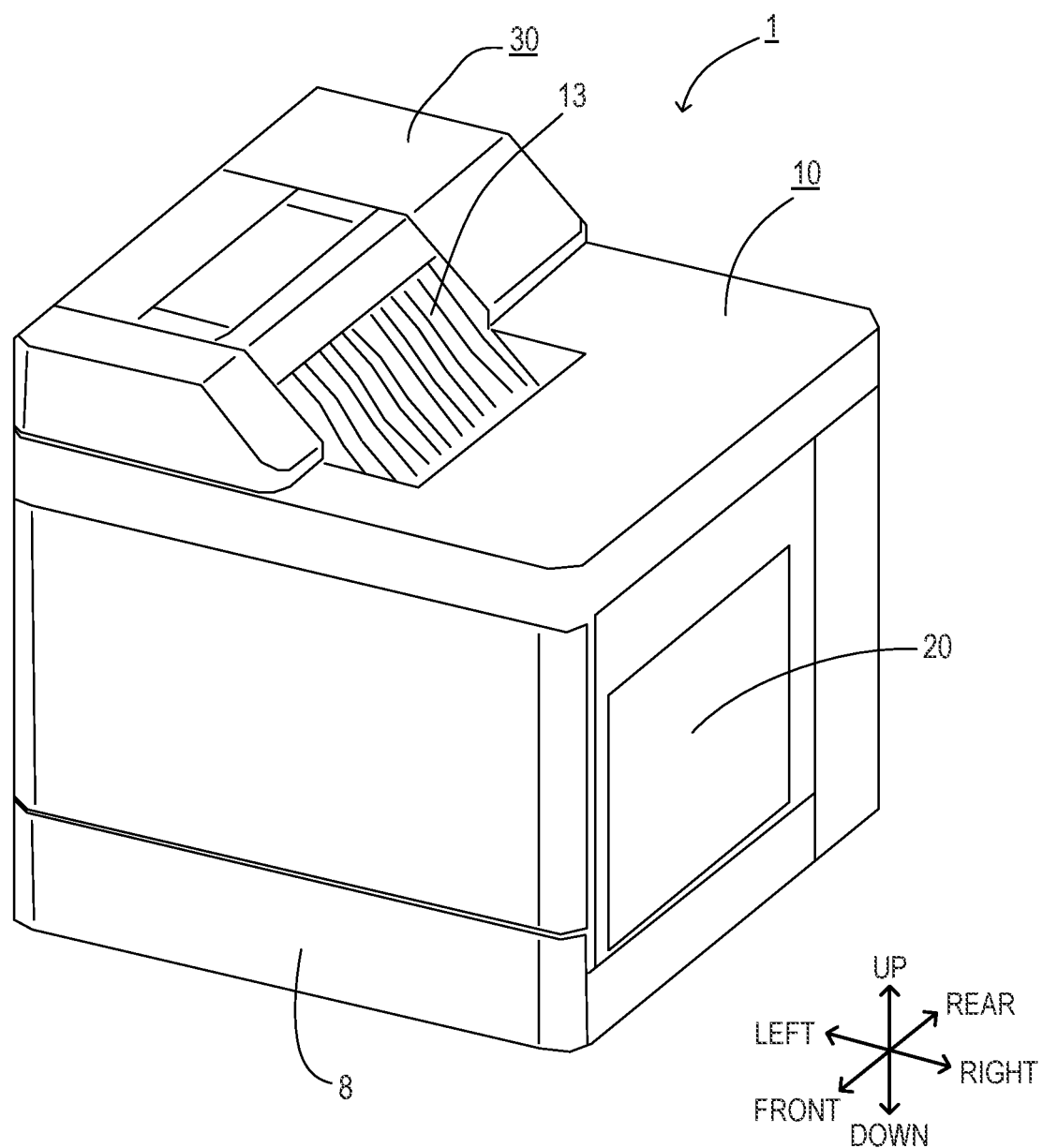
FIG. 6 is a perspective view showing an appearance of the image forming apparatus.

FIG. 6 is a perspective view showing an appearance of the image forming apparatus 1. The post-processing unit 30 is mounted on the upper part of the apparatus main body 10. The image forming apparatus 1 has a sheet cassette 8 in the lower part, an openable tray 20 on the right side surface, and a first discharge tray 13 on the upper surface.

First, the internal configuration of the apparatus main body 10 will be described. As shown in FIG. 1, the apparatus main body 10 includes a sheet cassette 8 as a sheet storage unit that stores sheets P as recording media, an image forming unit 1e as an image forming means, a first fixing device 6 as a fixing means, and a housing 19 that houses these components. The apparatus main body 10 has a printing function that forms a toner image on the sheet P fed from the sheet cassette 8 by the image forming unit 1e and performs fixing processing by the first fixing device 6 to create a print having an image fixed thereon.

The sheet cassette 8 is inserted into the housing 19 so as to be withdrawable therefrom in the lower part of the apparatus main body 10, and stores a large number of sheets P. The sheets P stored in the sheet cassette 8 are fed from the sheet cassette 8 by a feeding member such as a feeding roller, separated one by one by a separation roller pair, and conveyed by conveying rollers 8a. It is also possible to feed sheets set on the opened tray 20 (FIG. 6) one by one.

The image forming unit 1e is a tandem-type electrophotographic unit including four process cartridges 7n, 7y, 7m, 7c, a scanner unit 2, and a transfer unit 3. A process cartridge refers to a unit in which a plurality of parts responsible for an image forming process are integrated to be replaceable as a unit. The apparatus main body 10 is provided with a cartridge support 9 supported by the housing 19, and each process cartridge 7n, 7y, 7m, 7c is detachably attached to attachment parts 9n, 9y, 9m, 9c provided in the cartridge support 9. Note that the cartridge support 9 may be a tray member that is withdrawable from the housing 19.

The process cartridges 7n, 7y, 7m, 7c have substantially the same configuration except for the type of powder contained in the four powder containers 104n, 104y, 104m, 104c. That is, each process cartridge 7n, 7y, 7m, 7c includes a photoconductor drum 101 as an image carrier, a charging roller 102 as a charger, a powder container 104n, 104y, 104m, 104c containing powder, and a developing roller 105 that performs development using the powder.

Of the four powder containers, the three powder containers 104y, 104m, 104c on the right side in the drawing contain yellow, magenta, and cyan printing toners Ty, Tm, and Tc as toner (first powder) for forming a visible image on the sheet P. On the other hand, the leftmost powder container 104n in the drawing contains powder adhesive Tn, which is powder (second powder) for performing a press-bonding process after printing. The powder containers 104y, 104m, 104c are examples of first containers containing printing toner, and the powder container 104n is an example of a second container containing powder adhesive. Further, the process cartridges 7y, 7m, 7c are examples of first process units that form a toner image using printing toner, and the process cartridge 7n is an example of a second process unit that forms a powder adhesive image in a predetermined coating pattern.

Appropriate voltages instructed by a control unit (not shown) are applied to each of the developing roller 105, developer supply roller 106, developing blade 107, charging roller 102, transfer unit 3, and transfer means 5 by an unillustrated voltage applying means, considering the detection result of the temperature and humidity sensor 16 and the life information stored in the nonvolatile memories 110 held in each process cartridge 7y, 7m, 7c, 7n.

In the present example, when printing a black image such as text, the image is expressed by process black in which yellow (Ty), magenta (Tm), and cyan (Tc) toners are superimposed. However, for example, a fifth process cartridge using black printing toner may be added to the image forming unit 1e so that black images can be expressed with black printing toner. The types and numbers of printing toners can be changed according to the application of the image forming apparatus 1.

The scanner unit 2 is disposed below the process cartridges 7n, 7y, 7m, 7c and above the sheet cassette 8. The scanner unit 2 is an exposure unit of the present example that irradiates the photoconductor drums 101 of the process cartridges 7n, 7y, 7m, 7c with laser beams G to write electrostatic latent images.

The transfer unit 3 includes a transfer belt 3a as an intermediate transfer body (secondary image carrier). The transfer belt 3a is a belt member wound around a secondary transfer internal roller 3b and a stretching roller 3c, and faces the photoconductor drums 101 of the process cartridges 7n, 7y, 7m, 7c on the outer peripheral surface thereof. Primary transfer rollers 4 are arranged at positions corresponding to the photoconductor drums 101 on the inner peripheral side of the transfer belt 3a. Further, a secondary transfer roller 5 as a transfer means is arranged at a position facing the secondary transfer internal roller 3b. The transfer nip 5n between the secondary transfer roller 5 and the transfer belt 3a is a transfer portion (secondary transfer portion) where a toner image is transferred from the transfer belt 3a to the sheet P.

The first fixing device 6 is disposed above the secondary transfer roller 5. The first fixing device 6 is a fixing device of a heat fixing method having a heating roller 6a as a fixing member and a pressure roller 6b as a pressure member. The heating roller 6a is heated by a heating element such as a halogen lamp or ceramic heater or by an induction heating system. The pressure roller 6b is pressed against the heating roller 6a by an urging member such as a spring to generate a pressing force for pressing the sheet P passing through the nip portion (fixing nip 6n) between the heating roller 6a and the pressure roller 6b.

The housing 19 is provided with a discharge port 12 (first discharge port) which is an opening for discharging the sheet P from the apparatus main body 10, and a discharge unit 34 is disposed at the discharge port 12. The discharge unit 34, which is a discharge means of the present example, uses a so-called three-roller configuration having a first discharge roller 34a, an intermediate roller 34b, and a second discharge roller 34c.

Further, between the first fixing device 6 and the discharge unit 34, there is provided a switching guide 33 which is a flap-shaped guide for switching the conveyance path of the sheet P. The switching guide 33 is pivotal about a shaft portion 33a so that a distal end 33b reciprocates in the direction of arrow c in the drawing.

The apparatus main body 10 includes a mechanism for double-sided printing.

An unillustrated motor is connected to the discharge unit 34, and is configured to be capable of normal and reverse rotation with respect to the rotational direction of the intermediate roller 34b. Further, a double-sided conveyance path 1r is provided as a conveyance path connected in a loop shape to the main conveyance path 1m. A sheet P that has an image formed on the first surface while passing through the main conveyance path 1m is nipped and conveyed by the first discharge roller 34a and the intermediate roller 34b by the switching guide 33 that has pivoted in the clockwise direction. After the trailing end of the sheet P in the traveling direction has passed through the switching guide 33, the switching guide 33 pivots counterclockwise and the intermediate roller 34b rotates in reverse, so that the sheet P is reversed and conveyed to the double-sided conveyance path 1r. Then, while the sheet P passes through the main conveyance path 1m again with the front and back sides inverted, an image is formed on the second surface of the sheet P.

After double-sided printing, the sheet P is nipped and conveyed by the intermediate roller 34b and the second discharge roller 34c by the switching guide 33 that has pivoted counterclockwise and discharged from the apparatus main body 10.

Further, in the apparatus main body 10, the conveyance path passing through the conveyance roller 8a, the transfer nip 5n, and the fixing nip 6n constitutes a main conveyance path 1m on which image formation is performed on the sheet P. Viewed from the main scanning direction during image formation (width direction of the sheet perpendicular to the conveyance direction of the sheet conveyed along the main conveyance path 1m), the main conveyance path 1m extends upward from below through one side in the horizontal direction with respect to the image forming unit 1e. In other words, the apparatus main body 10 of the present example is a so-called vertical conveyance type (vertical path type) printer in which the main conveyance path 1m extends substantially in the vertical direction. Note that, when viewed in the vertical direction, the first discharge tray 13, the intermediate path 15, and the sheet cassette 8 overlap each other. Therefore, the moving direction of the sheet when the discharge unit 34 discharges the sheet P in relation to the horizontal direction is opposite to the moving direction of the sheet when the sheet P is fed from the sheet cassette 8 in relation to the horizontal direction.

Further, in the viewpoint of FIG. 1 (when viewed from the main scanning direction during image formation), it is preferable that the horizontal direction occupancy range of the main body portion excluding the second discharge tray 35 of the post-processing unit 30 falls within the occupancy range of the apparatus main body 10. By housing the post-processing unit 30 in this way in the space above the apparatus main body 10, it is possible to install the image forming apparatus 1 having a press-bonding print function in an installation space approximately the same as a normal vertical path type printer.

<Press-Bonding Unit>

Figure 2:
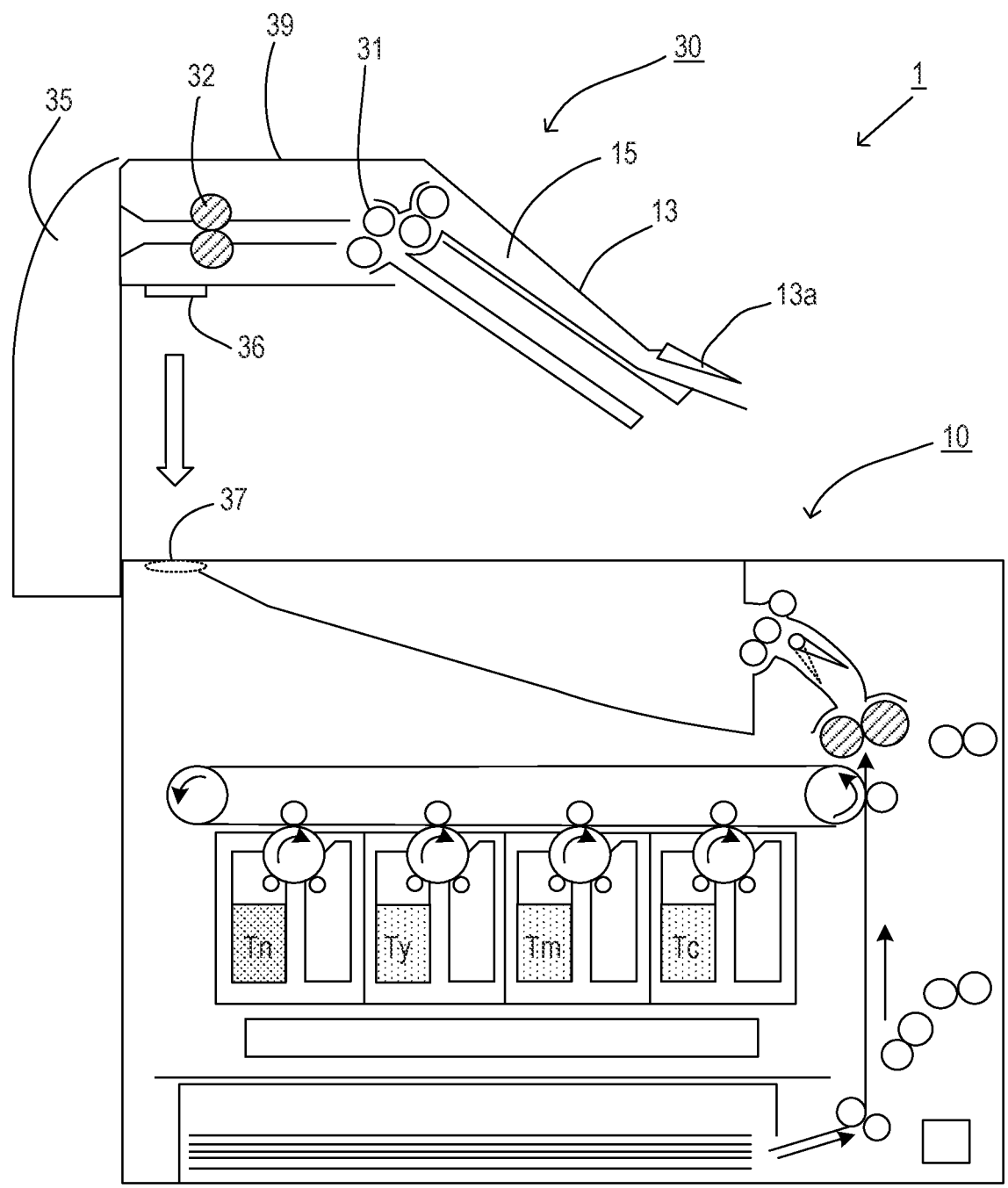
FIG. 2 is a diagram for explaining mounting of the press-bonding unit to the apparatus main body of the image forming apparatus.

As shown in FIG. 2, a post-processing unit 30 which is a press-bonding unit is attached to the upper part of the apparatus main body 10. The post-processing unit 30 is a post-processing unit that includes a folding device 31 as a folding means and a second fixing device 32 as a press-bonding means (second fixing means), housed in a housing (second housing) 39 as a single unit. The post-processing unit 30 is also provided with a first discharge tray 13 which rotatably holds a tray switching guide 13a, an intermediate path 15, and a second discharge tray 35. The first discharge tray 13 is provided on the upper surface of the post-processing unit 30 and is also located on the upper surface (FIG. 1) of the entire image forming apparatus 1. The functions of the respective units provided in the post-processing unit 30 will be described later.

The post-processing unit 30 is provided with a positioning unit (for example, a convex portion that engages with a concave portion of the housing 19) for positioning the housing 39 relative to the housing 19 (first housing) of the apparatus main body 10. The post-processing unit 30 is also provided with a drive source and a control unit (not shown) separate from the apparatus main body 10, and coupling of the connector (convex portion) 36 of the post-processing unit 30 and the connector (concave portion) 37 of the apparatus main body 10 allows for electrical connection to the apparatus main body 10. Thus, the post-processing unit 30 operates based on commands from a control unit (not shown) provided in the apparatus main body 10 using electric power supplied through the apparatus main body 10.

<Process Cartridge>

Figure 8:
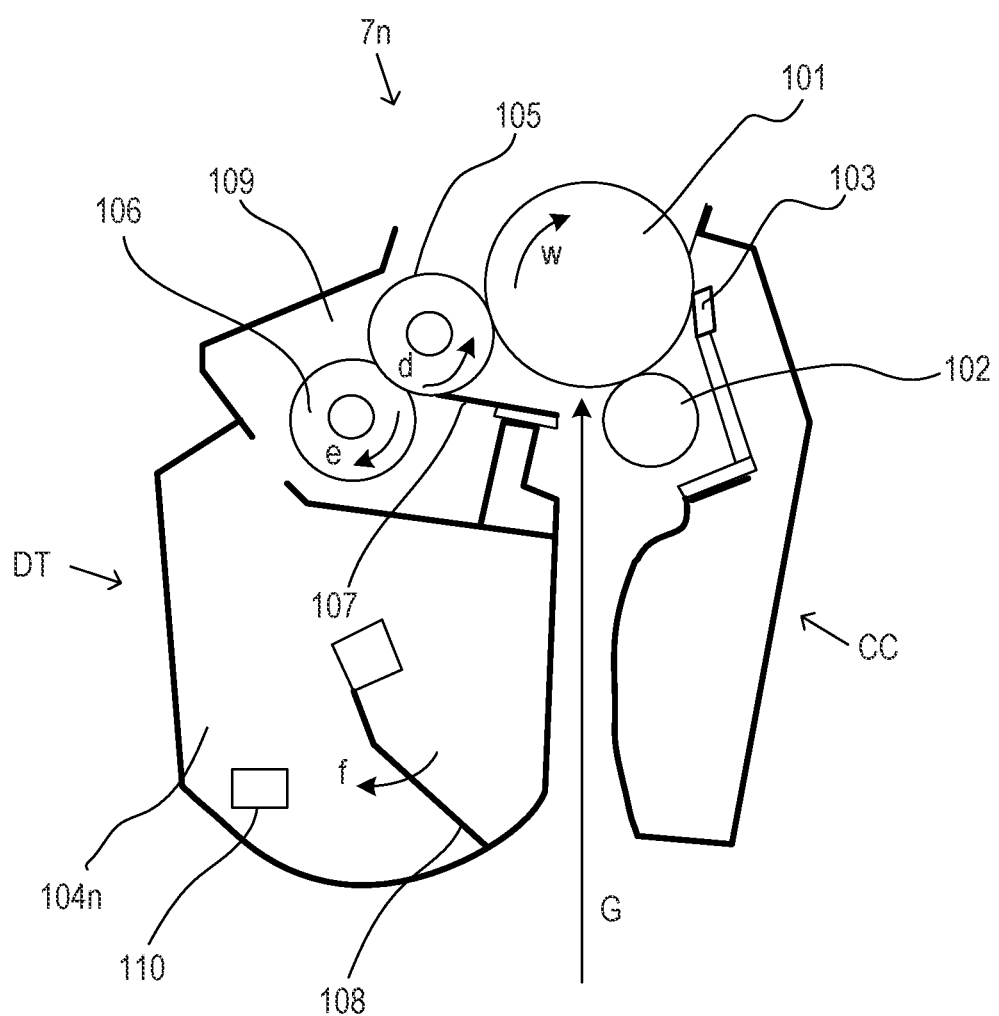
FIG. 8 is a schematic diagram of a process cartridge.

As described above, the process cartridges 7n, 7y, 7m, 7c have substantially the same configuration except for the type of powder contained in the four powder containers 104n, 104y, 104m, 104c. Here, the process cartridge 7n will be described as a representative example. FIG. 8 is a schematic sectional view of the process cartridge 7n. The process cartridge 7n includes a photoconductor unit CC including a photoconductor drum 101 and the like, and a developing unit DT including a developing roller 105 and the like.

The photoconductor drum 101 is rotatably attached to the photoconductor unit CC via an unillustrated bearing. The photoconductor drum 101 is a φ24 mm aluminum cylinder coated with an undercoat layer, an insulating layer, a photosensitive layer, and a charge transfer layer, and is capable of forming an electrostatic latent image on the surface. The photoconductor drum 101 is rotationally driven at 200 mm/sec in the clockwise direction in the drawing (arrow w) in accordance with the image forming operation by receiving a driving force from an unillustrated driving means (drive motor) as a drive source. Further, the photoconductor unit CC is arranged with a charging roller 102 for charging the photoconductor drum 101 and a cleaning member 103, around the photoconductor drum 101.

The developing unit DT is provided with a developing roller 105 that rotates in contact with the photoconductor drum 101 in the counterclockwise direction in the drawing (arrow d) as a developer carrying member. The developing roller 105 has a φ12 mm conductive rubber arranged around a metal core. The developing roller 105 and the photoconductor drum 101 rotate so that their surfaces move in the same direction at the opposing portion (contact portion). The rotational speed of the developing roller 105 is faster than that of the photoconductor drum 101, and is set at 280 mm/sec.

The developing unit DT is also provided with a developer supply roller 106 (hereinafter simply referred to as "supply roller") rotating at 320 mm/sec in the clockwise direction in the drawing (arrow e) as a developer supply member. The supply roller 106 has a φ13 mm conductive sponge arranged around a metal core. The supply roller 106 and the developing roller 105 rotate so that their surfaces move in the same direction at the opposing portion (contact portion). The supply roller 106 supplies powder adhesive (printing toner in the case of process cartridges 7y, 7m, 7c) onto the developing roller 105 and also has the function of scraping off the powder adhesive (printing toner in the case of process cartridges 7y, 7m, 7c) remaining on the developing roller 105 from the developing roller 105. Further, the developing unit DT is provided with a developing blade 107 as a developer regulating member for regulating the layer thickness of the powder adhesive (printing toner in the case of process cartridges 7y, 7m, 7c) supplied onto the developing roller 105 by the supply roller 106.

The powder container 104n houses powder adhesive (printing toner in the case of process cartridges 7y, 7m, 7c) as powder. Further, a conveyance member agitating member 108 rotatably supported is provided inside the powder container 104n. The agitating member 108 rotates in the clockwise direction in the drawing (arrow f) to agitate the powder housed in the powder container 104n and convey the powder to a developing chamber 109 provided with the developing roller 105 and the supply roller 106 described above.

Here, the photoconductor unit CC and the developing unit DT may be configured as separate units, as a photoconductor unit cartridge and a developing unit cartridge respectively, to be detachably attachable to the image forming apparatus main body. It is also possible to configure only the powder container 104 and the conveying member 108 as a powder cartridge having a powder container and a conveying member detachably attachable to the apparatus main body. Also, only the process cartridge 7n may be mounted and driven to create a product using only the powder adhesive Tn.

<Image Forming Operation>

Figure 3:
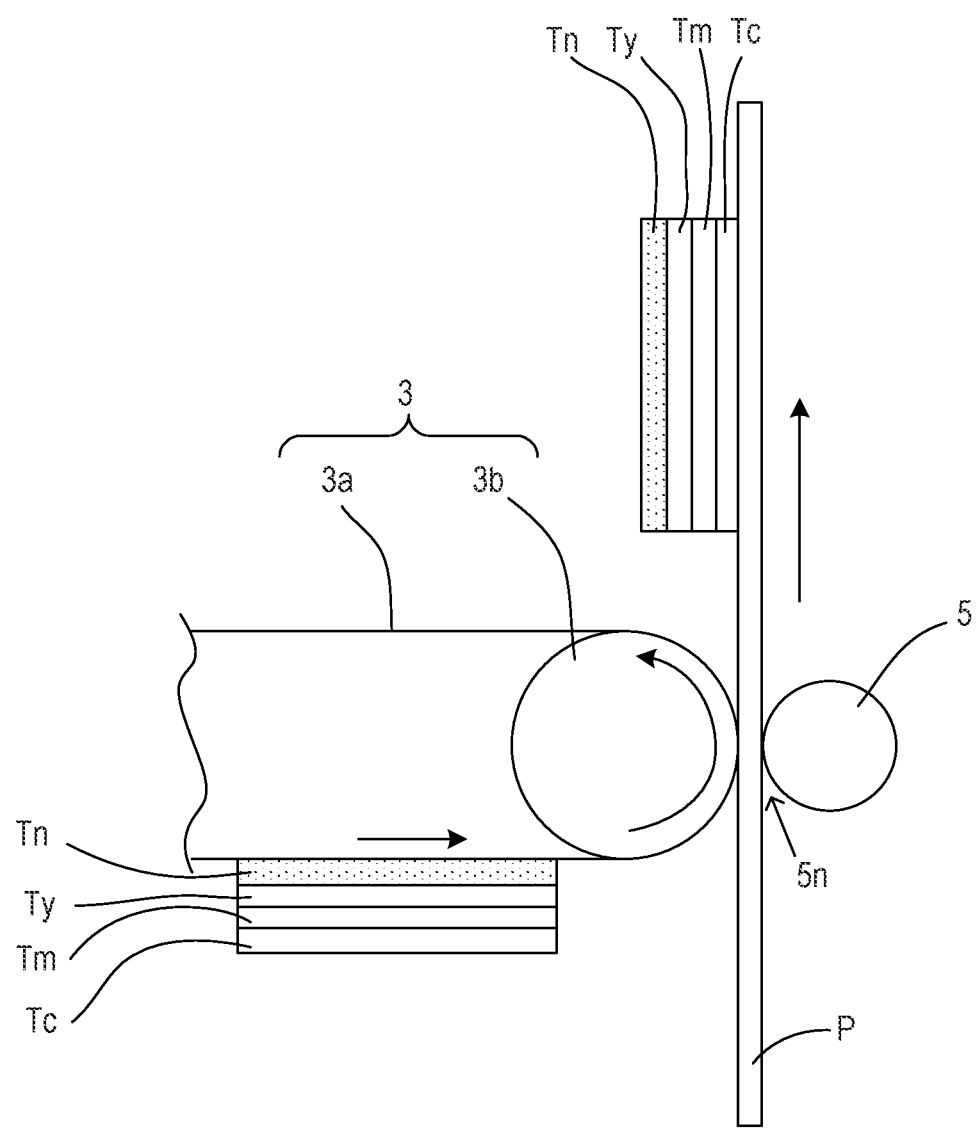
FIG. 3 is a schematic diagram for explaining the state of a toner image transferred to a sheet.
Figure 4A:
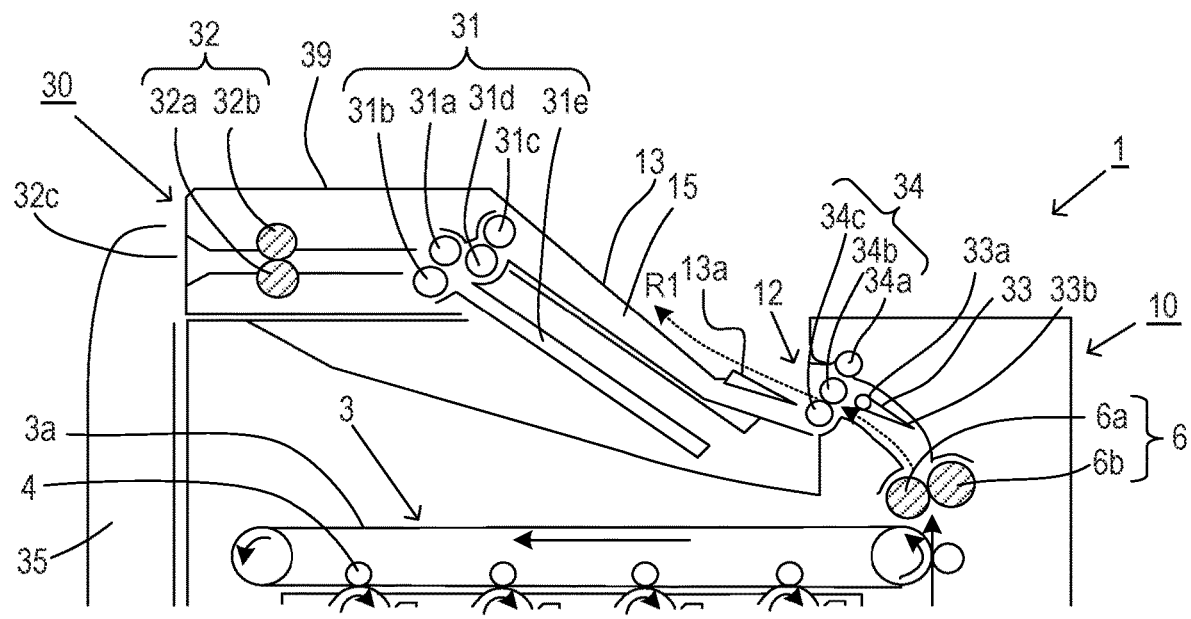
FIG. 4A is a diagram showing the conveyance path of sheets in the image forming apparatus.
Figure 4B:
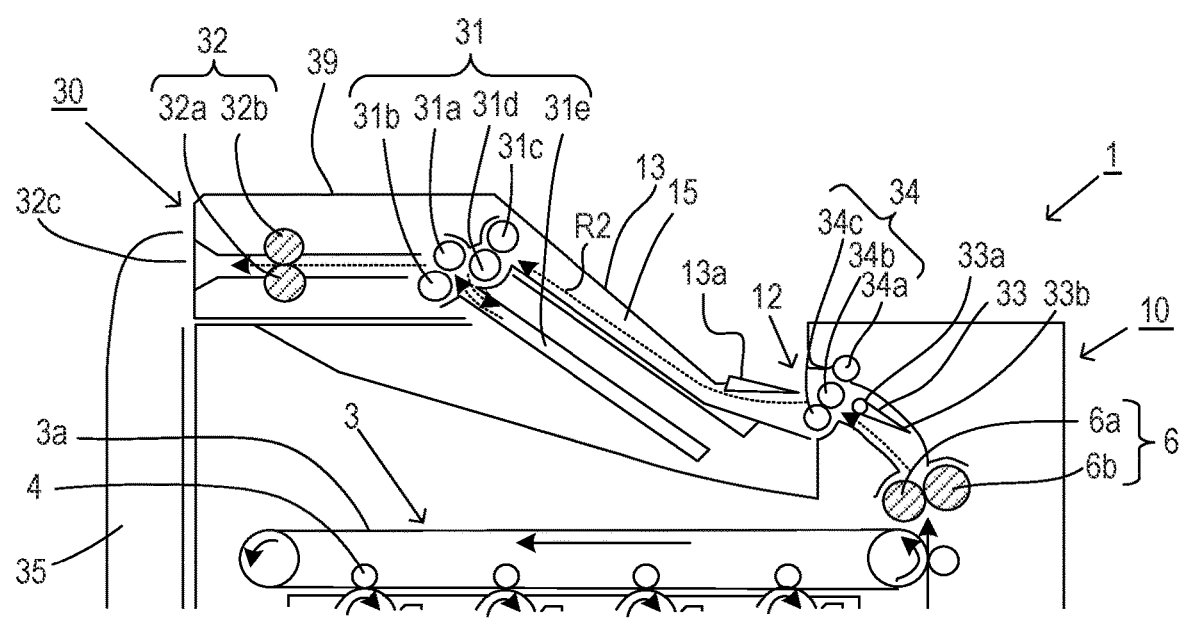
FIG. 4B is a diagram showing the conveyance path of sheets in the image forming apparatus.
Figure 7A:
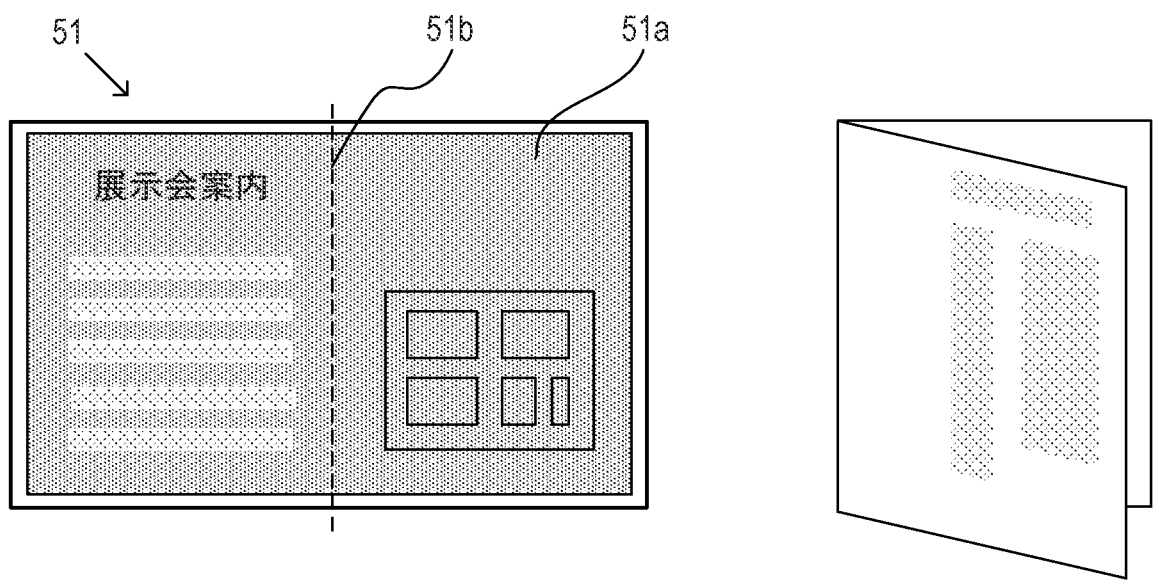
FIG. 7A is a diagram illustrating an example of a product outputted by the image forming apparatus.
Figure 7B:
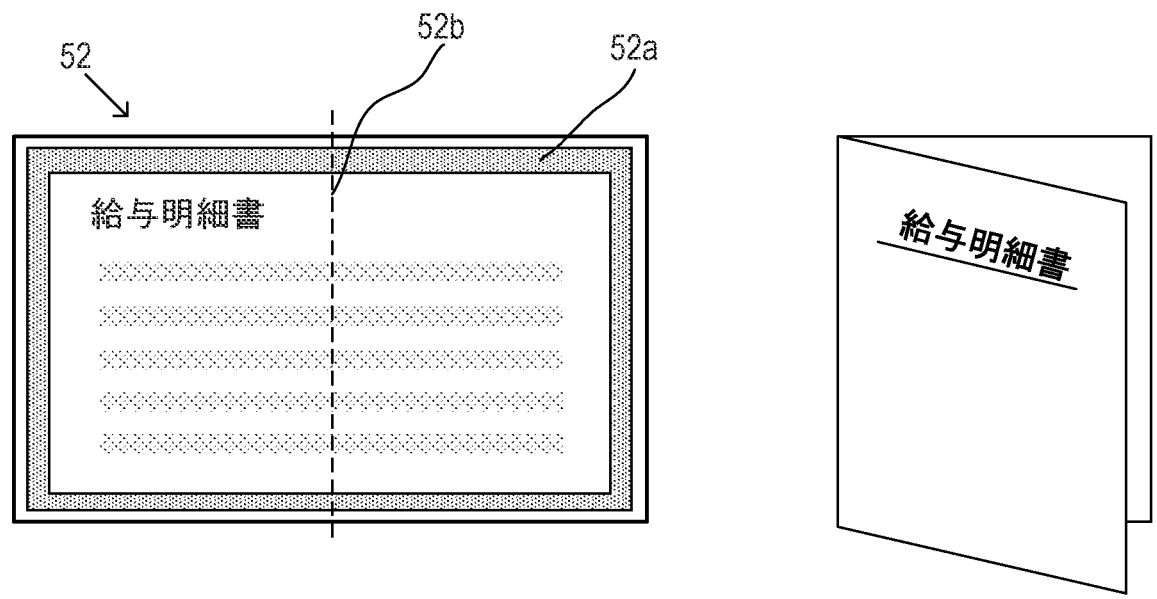
FIG. 7B is a diagram illustrating an example of a product outputted by the image forming apparatus.

Next, the image forming operation performed by the image forming apparatus 1 of the present example will be described with reference to FIGS. 1 to 8. FIG. 3 is a schematic diagram for explaining the state of the toner image transferred to the sheet P. FIGS. 4A and 4B are diagrams showing the conveyance path of the sheet in the image forming apparatus 1. FIGS. 5A to 5F are diagrams for explaining the details of the folding process. FIGS. 7A and 7B are diagrams illustrating examples of products outputted by the image forming apparatus 1.

When image data to be printed and a print execution command are inputted to the image forming apparatus 1, a control unit (not shown) of the image forming apparatus 1 starts a series of operations (image forming operations) of conveying sheets P to form images and performing post-processing by the post-processing unit 30 as necessary. In the image forming operation, first, as shown in FIG. 1, sheets P are fed one by one from the sheet cassette 8 and conveyed toward the transfer nip 5n via the conveyance roller 8a.

In parallel with the feeding of the sheets P, the process cartridges 7n, 7y, 7m, 7c are sequentially driven, and the photoconductor drums 101 are rotated in the clockwise direction in the drawing (arrow w). At this time, the surface of the photoconductor drum 101 is uniformly charged by the charging roller 102. Further, the scanner unit 2 modulates the laser beam G based on the image data to irradiate the photoconductor drums 101 of the process cartridges 7n, 7y, 7m, 7c, forming electrostatic latent images on the surfaces of the photoconductor drums 101. Next, the electrostatic latent images on the photoconductor drums 101 are developed as powder images by the powder carried on the developing rollers 105 of the respective process cartridges 7n, 7y, 7m, 7c.

It should be noted that the powder adhesive layer formed on the photoconductor drum 101 upon development by the powder adhesive Tn is different from the toner image (normal toner image) of printing toner for recording an image such as a graphic or text on the sheet Pin that it does not convey visual information. However, in the following description, in order to apply the powder adhesive Tn to the sheet P in a predetermined coating pattern, a layer of powder adhesive Tn developed in a shape corresponding to the coating pattern by the electrophotographic process is also treated as one of the "toner images".

The transfer belt 3a rotates in the counterclockwise direction in the drawing (arrow v). The toner images formed in each process cartridge 7n, 7y, 7m, 7c are primarily transferred from the photoconductor drums 101 onto the transfer belt 3a by an electric field formed between the photoconductor drums 101 and the primary transfer rollers 4.

Here, as shown in FIG. 1, in the rotational direction of the transfer belt 3a, the process cartridge 7n using the powder adhesive Tn is located most upstream among the four process cartridges. Further, from the process cartridge 7n toward the downstream side in the rotation direction of the transfer belt 3a, yellow, magenta, and cyan process cartridges 7y, 7m, 7c are arranged in this order. Therefore, as shown in FIG. 3, when the four types of toner images overlap on the transfer belt 3a, the powder adhesive Tn is the lowermost layer (the layer in contact with the transfer belt 3a), and the yellow (Ty), magenta (Tm), and cyan (Tc) printing toners are stacked in this order thereon.

The toner images carried on the transfer belt 3a and reaching the transfer nip 5n are secondarily transferred onto the sheet P conveyed along the main conveyance path 1m by an electric field formed between the secondary transfer roller 5 and the secondary transfer internal roller 3b. At that time, the top and bottom of the toner layers are inverted. That is, the sheet P passing through the transfer nip 5n is formed with cyan (Tc), magenta (Tm), and yellow (Ty) printing toners stacked from the lowermost layer (the layer in contact with the sheet P), and further the layer of powder adhesive Tn is formed thereon. Therefore, in the toner image transferred to the sheet P, the layer of powder adhesive Tn is the outermost surface.

Thereafter, the sheet P is conveyed to the first fixing device 6 and subjected to heat fixing treatment. That is, when the sheet P passes through the fixing nip 6n, the printing toners Ty, Tm, Tc and the powder adhesive Tn melt due to the heating and pressing of the toner image on the sheet P, and then solidify to obtain a fixed image on the sheet P.

Regardless of single-sided printing or double-sided printing, the sheet P discharged from the apparatus main body 10 is nipped and conveyed by the intermediate roller 34b and the second discharge roller 34c as shown in FIGS. 4A and 4B, and conveyed to the first path R1 or the second path R2 by the tray switching guide 13a.

The first path R1 shown in FIG. 4A is a path in which, in the normal printing mode without using the post-processing unit 30, the sheet P passed through the first fixing device 6 is discharged to the first discharge tray 13 by the discharge unit 34. The second path R2 shown in FIG. 4B is a path in which, in the press-bonding print mode, the sheet P passed through the first fixing device 6 is discharged to the second discharge tray 35 through the discharge unit 34, the folding device 31, and the second fixing device 32.

An intermediate path 15 is provided between the first fixing device 6 and the folding device 31 along the second path R2. The intermediate path 15 is a sheet conveyance path passing through the upper surface portion (top surface portion) of the image forming apparatus 1, extending below and substantially parallel to the first discharge tray 13. Note that the intermediate path 15 and the first discharge tray 13 are inclined upward in the vertical direction in relation to the horizontal direction toward the folding device 31. Therefore, the inlet of the folding device 31 (the guide roller pair 31c, 31d described below) is located above in the vertical direction than the outlet of the apparatus main body 10 (the nip between the intermediate roller 34b and the second discharge roller 34c).

The folding device 31 includes four rollers: a first guide roller 31c, a second guide roller 31d, a first folding roller 31a, and a second folding roller 31b; and a pulling-in section 31e. The first guide roller 31c and the second guide roller 31d are a guide roller pair that nips and conveys the sheet P received from the upstream conveyance path (intermediate path 15 in this example) of the folding device 31. The first folding roller 31a and the second folding roller 31b are a folding roller pair that feeds out the sheet P while folding it.

Note that the interval M (FIG. 1) from the second discharge roller 34c to the first guide roller 31c along the sheet conveyance direction in the second path R2 is configured to be shorter than the total length L (FIG. 5A) in the conveyance direction of the pre-folded sheet P. In other words, the lower limit of the length in the conveyance direction of sheets that can be processed by the post-processing unit 30 is determined by the interval M between the second discharge roller 34c and the first guide roller 31c. With this configuration, the sheet P can be smoothly handed over from the discharge unit 34 to the guide roller pair.

Figure 5A:
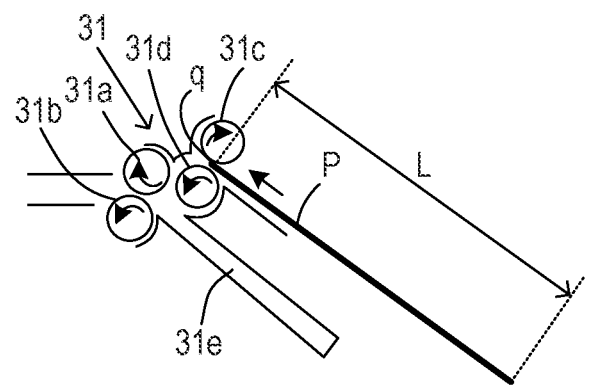
FIG. 5A is a diagram for explaining the details of the folding process.
Figure 5B:
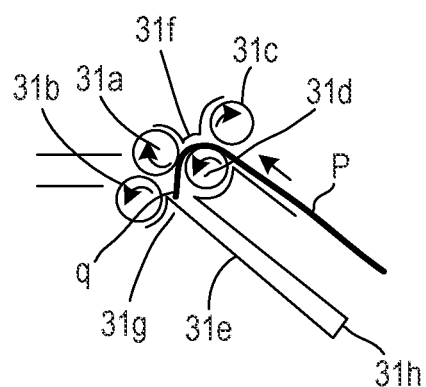
FIG. 5B is a diagram for explaining the details of the folding process.

Folding processing by the folding device 31 will be described with reference to FIGS. 5A to 5F. When executing the folding process, the first guide roller 31c and the first folding roller 31a rotate clockwise in the drawings, and the second guide roller 31d and the second folding roller 31b rotate counterclockwise in the drawings. First, as shown in FIG. 5A, the leading edge q of the sheet P sent out from the discharge unit 34 is drawn into the guide roller pair (31c, 31d). As shown in FIG. 5B, the leading edge q of the sheet P is guided downward by the guide wall 31f, comes into contact with the first folding roller 31a, and is drawn into the opposing first folding roller 31a and second guide roller 31d to abut against the wall 31g of the pulling-in section 31e.

Figure 5C:
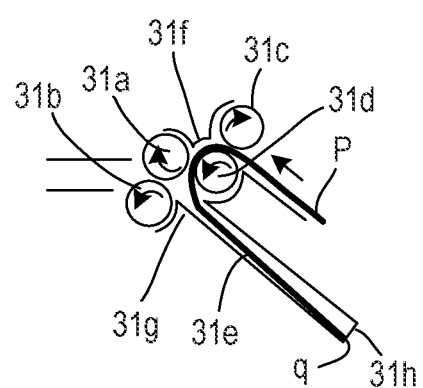
FIG. 5C is a diagram for explaining the details of the folding process.

As the sheet P is pulled in by the guide roller pair (31c, 31d), the leading edge q slides while contacting the wall 31g and advances deep into the pulling-in section 31e. Eventually, as shown in FIG. 5C, the leading edge q hits the end 31h of the pulling-in section 31e. Note that the pulling-in section 31e forms a space extending substantially parallel to the intermediate path 15 on the lower side of the intermediate path 15, and at the stage of FIG. 5C, the sheet P is wound around the second guide roller 31d and bent in a U-shape.

Figure 5D:
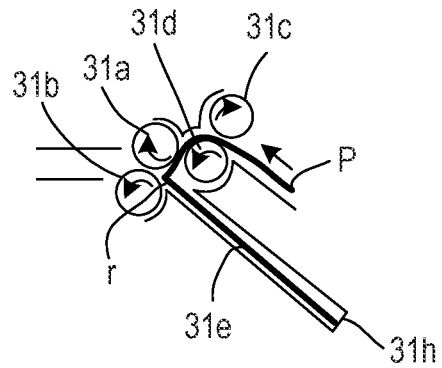
FIG. 5D is a diagram for explaining the details of the folding process.
Figure 5E:
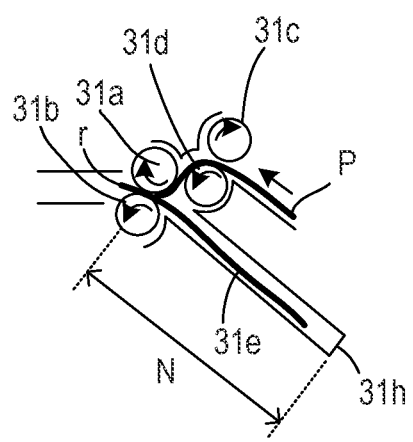
FIG. 5E is a diagram for explaining the details of the folding process.
Figure 5F:
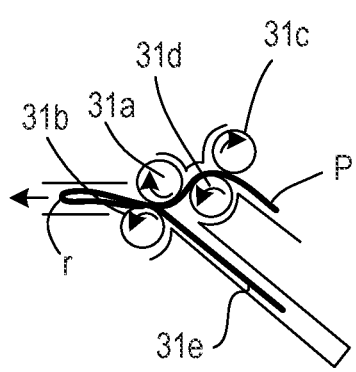
FIG. 5F is a diagram for explaining the details of the folding process.

From the state of FIG. 5C, as the sheet P is further pulled in by the guide roller pair (31c, 31d), a deflection starts to occur at the middle part r as shown in FIG. 5D. Eventually, as shown in FIG. 5E, when the middle part r comes into contact with the second folding roller 31b, it is drawn into the nip portion of the folding roller pair (31a, 31b) by the frictional force received from the second folding roller 31b. Then, as shown in FIG. 5F, the sheet P is folded with the middle part r as a fold line, and is discharged by the folding roller pair (31a, 31b) with the middle part r at the front.

Here, the depth N of the pulling-in section 31e (FIG. 5E), that is, the distance from the nip portion of the folding roller pair (31a, 31b) to the end 31h of the pulling-in section 31e, is set to half the total length L of the sheet P. Thus, the folding device 31 can perform processing to fold the sheet P in half at half the length (center folding). Note that the position of the fold line can be desirably changed by changing the depth N of the pulling-in section 31e.

The folding device 31 described above is an example of a folding means. For example, a folding mechanism may be used that forms a fold line by pressing a blade against the sheet P and pushing it into the nip portion of a roller pair. Further, the folding process is not limited to center folding, and a folding mechanism that performs, for example, Z-folding or tri-folding may be used. Note that since the folding device 31 of the present example is composed of rotating rollers and a fixed pulling-in section 31e, the driving mechanism can be simplified compared to a folding mechanism using a reciprocating blade. Further, other than four rollers, the folding device 31 of the present example only needs to have a pulling-in section 31e having a depth N that is half the sheet length, so that the post-processing unit 30 can be downsized.

The sheet P passed through the folding device 31 is conveyed to the second fixing device 32 as shown in FIG. 4B. The second fixing device 32 has the same heat fixing configuration as the first fixing device 6. That is, the second fixing device 32 includes a heating roller 32b as a heating member and a pressure roller 32a as a pressure member. The heating roller 32b is heated by a heating element such as a halogen lamp or ceramic heater or by an induction heating system. The pressure roller 32a is pressed against the heating roller 32a by an urging member such as a spring to generate a pressing force for pressing the sheet P passing through the nip portion (press-bonding nip) between the heating roller 32b and the pressure roller 32a.

By undergoing a press-bonding process (second heat fixing to the image surface to which the powder adhesive Tn is applied) by the second fixing device 32, the sheet P folded by the folding device 31 remains folded while being press-bonded. That is, when the sheet P passes through the press-bonding nip, the powder adhesive Tn on the sheet P is heated and re-melted while being pressurized, whereby it adheres to the facing surface (the surface facing the image surface of the sheet P to which the toner image of powder adhesive Tn has been transferred in the folded state). Then, the image surface and the facing surface of the sheet P are bonded (adhered) with the powder adhesive Tn as an adhesive by the powder adhesive Tn solidifying by cooling.

As shown in FIG. 4B, the sheet P subjected to the press-bonding process by the second fixing device 32 is discharged leftward in the drawing from a discharge port 32c (second discharge port) provided in the housing 39 of the post-processing unit 30. It is then stored in the second discharge tray 35 (see FIG. 1) provided on the left side surface of the apparatus main body 10. Thus, the operation of image formation when the sheet P is conveyed through the second path R2 is completed.

Note that the bonding position of the folded sheet P can be changed depending on the coating pattern of the powder adhesive Tn on the sheet P. FIGS. 7A and 7B illustrate products (products of the image forming apparatus) with different coating patterns of powder adhesive Tn. FIGS. 7A and 7B show examples of products (semi-sealed products) for applications where the recipient opens them. In the case of the crimped postcard 51 in FIG. 7A, the powder adhesive Tn is applied to the entire surface 51a on one side of the sheet P and press-bonded in a state of being folded at a central fold line 51b. In the case of the payroll statement 52 in FIG. 7B, the powder adhesive Tn is applied over the entire periphery 52a of the outer periphery on one side of the sheet P and press-bonded in a state of being folded at a central fold line 52b.

The image forming apparatus 1 of the present example can also output either of the products illustrated in FIGS. 7A and 7B in a one-stop process without preparing preprinted paper. That is, it is possible to output a product subjected to folding processing and press-bonding processing while applying the powder adhesive Tn in a predetermined coating pattern in parallel with the operation of recording images on one or both sides of the sheet P using printing toner. For example, when outputting the products in FIGS. 7A and 7B, one side of the sheet P used as base paper becomes the outside of the product, and the other side becomes the inside of the product. Therefore, it suffices that in double-sided printing, the image forming operation on the first side uses printing toner to form an image for the outer side, and the image forming operation on the second side uses printing toner to form an image for the inner side and applies the powder adhesive Tn in a predetermined coating pattern.

Images recorded by the image forming apparatus 1 using printing toner may include formats (invariable portions) in the case of using preprinted paper as well as variable portions such as personal information. Therefore, in the present example as described above, a product press-bonded by a press-bonding process can be outputted from base paper such as blank paper instead of preprinted paper. However, the image forming apparatus 1 of the present example can also be used for applications where preprinted paper is used as a recording medium to perform printing processing of variable portions and press-bonding processing.

<Printing Toner>

Conventionally known printing toners can be used for image formation in the present disclosure. Among them, printing toners using a thermoplastic resin as a binder resin are preferable. There is no particular limitation on the resin that can be used as the thermoplastic resin, and resins conventionally used in printing toners such as polyester resins, vinyl-based resins, acrylic resins, and styrene-acrylic resins can be used. The thermoplastic resin may contain multiple of these resins. Among them, printing toners using styrene-acrylic resin are more preferable. The printing toner may contain a colorant, a magnetic material, a charge control agent, wax, an external additive, and the like <Powder Adhesive>

The present disclosure uses a powder adhesive Tn containing a thermoplastic resin as a main constituent material. A feature of the present disclosure is that the fracture strain of the main constituent material of the powder adhesive Tn is 10% or more and less than 1000%, preferably 15% or more and 600% or less. The "main constituent material" refers to a component contained in an amount exceeding 50 mass %, and the content thereof is preferably 60 mass % or more, more preferably 70 mass % or more, and particularly preferably 80% or more.

Figure 9:
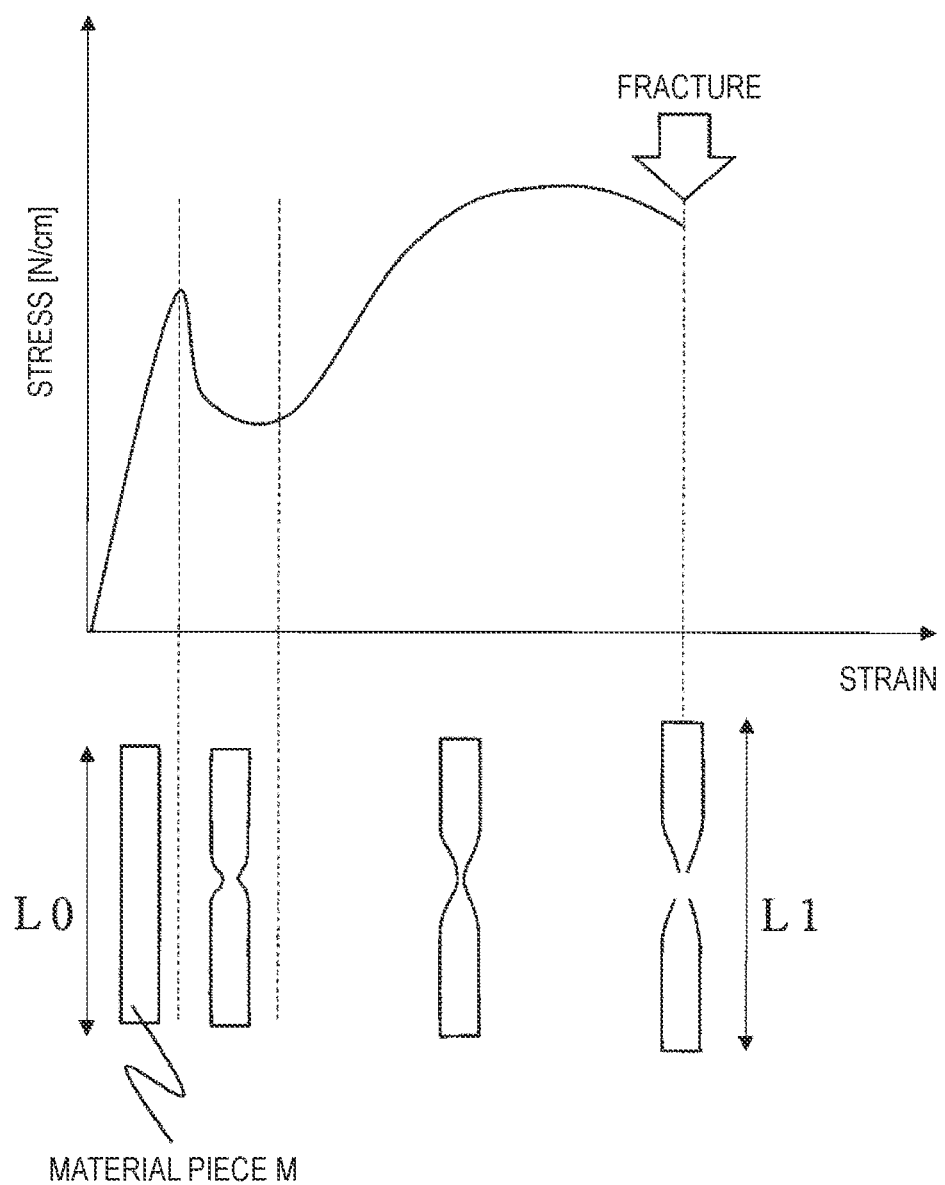
FIG. 9 is a diagram for explaining fracture strain.

Fracture strain will be described with reference to FIG. 9. FIG. 9 illustrates a graph of strain and stress when a sheet-shaped material piece M is pulled, and the state of the material piece M. The sheet-shaped material piece M is created by heating and pressurizing powder or pellets of the material in a hot press with a 50 μm spacer. When measuring the fracture strain, both ends of the material piece are supported with chucks, and a tensile test is performed at a tensile speed of 50 mm/min using an unillustrated RTG-1225 Tensilon universal testing machine manufactured by A&D Company, Limited to obtain a stress-strain curve. As the sheet-shaped material piece M continues to be pulled, the stress increases and eventually ruptures. The ratio of the amount of strain when the material piece M is pulled and ruptures to the initial length is defined as the fracture strain. The calculation method is:

Fracture strain (%)=(Length $L1$ at rupture−Initial length $L0$)/(Initial length $L0$)×100.

For example, if the fracture strain is 10%, when the initial length is 10 cm, the length at rupture is 11 cm. Also, if the fracture strain is 1000%, when the initial length is 10 cm, the length at rupture is 110 cm. In other words, the higher the fracture strain, the more stretchable the material.

The main constituent material of the powder adhesive is usually a thermoplastic resin. There is no particular limitation on the resin that can be used as the thermoplastic resin, and known thermoplastic resins such as polyester resins, vinyl-based resins, acrylic resins, styrene-acrylic resins, polyethylene, polypropylene, polyolefins, ethylene-vinyl acetate copolymer resins, ethylene-acrylic acid copolymer resins, and the like can be used. One kind selected from these resins may be used alone or multiple resins may be contained.

It is desirable that the elastic modulus of the main constituent material of the powder adhesive of the present disclosure is 1.0 GPa or less (1000 MPa or less).

The elastic modulus affects the force against deformation and thus the force required during peeling after adhesion. The higher the elastic modulus, the more force is required for peeling, posing a risk of sheet destruction. Therefore, high fracture strain and low elastic modulus are desirable. For example, low-density polyethylene and polyvinyl chloride can be cited.

In order to form an adhesive portion by the powder adhesive Tn on a recording material using the electrophotographic method, the weight average particle diameter of the powder adhesive Tn is preferably 5.0 μm or more to 30 μm or less, more preferably 6.0 μm or more to 20 μm or less.

(Method for Measuring Weight Average Particle Diameter)

The weight average particle diameter of the printing toner and powder adhesive is calculated as follows.

As a measuring device, a precision particle size distribution measuring device "Coulter Counter Multisizer 3" (registered trademark, manufactured by Beckman Coulter, Inc.) equipped with an aperture tube having an aperture diameter of 100 μm by a pore electrical resistance method is used. Setting of measurement conditions and analysis of measurement data are performed using the dedicated software "Beckman Coulter Multisizer 3 Version 3.51" (manufactured by Beckman Coulter, Inc.) attached to the device. The measurement is performed with an effective measurement channel number of 25,000 channels.

As an electrolyte aqueous solution used for the measurement, one obtained by dissolving special grade sodium chloride in ion-exchanged water so that the concentration is 1% by mass, for example, "ISOTON II" (manufactured by Beckman Coulter, Inc.) can be used.

Prior to measurement and analysis, set the dedicated software as follows.

On the "Change Standard Measurement Method (SOM)" screen of the dedicated software, set the total count number in the control mode to 50000 particles, set the number of measurements to 1, and set the value obtained using "Standard Particles 10.0 μm" (manufactured by Beckman Coulter, Inc.) as the Kd value. By pressing the "Measurement button for threshold/noise level", the threshold and noise level are automatically set. Also, set the current to 1600 μA, the gain to 2, the electrolyte to ISOTON II, and check "Flash aperture tube after measurement".

On the "Conversion setting from pulse to particle size" screen of the dedicated software, set the bin interval to logarithmic particle size, the particle size bin to 256 particle size bins, and the particle size range from 2 μm to 60 μm.

The specific measurement method is as follows:

(1) Two hundred milliliters of electrolyte aqueous solution is put into a 250 mL glass round bottom beaker dedicated for Multisizer 3 and set on a sample stand and stirred counterclockwise at 24 revolutions/second with a stirrer rod. Then, dirt and air bubbles in the aperture tube are removed using the "Flash aperture tube" function of the dedicated software.

(2) Thirty milliliters of electrolyte aqueous solution is put into a 100 mL glass flat bottom beaker. To this is added 0.3 mL of a dilution obtained by diluting "Contaminon N" (a 10 mass % aqueous solution of pH 7 precision measuring instrument cleaning neutral detergent consisting of nonionic surfactant, anionic surfactant, and an organic builder, manufactured by Wako Pure Chemical Industries) 3 times by mass with ion-exchanged water.

(3) Prepare an ultrasonic dispersion system "Ultrasonic Dispersion System Tetora 150" (manufactured by Nikkaki Bios, Co., Ltd.) with a built-in two oscillators having an oscillation frequency of 50 kHz shifted in phase by 180 degrees and an electrical output of 120 W.

Put 3.3 L of ion-exchanged water in the water tank of the ultrasonic disperser and add 2 mL of Contaminon N thereto.
(4) Set the beaker of (2) above in the beaker fixing hole of the ultrasonic disperser described above, operate the ultrasonic disperser. Then, adjust the height position of the beaker so that the resonance state of the liquid surface of the electrolyte aqueous solution in the beaker becomes maximum.
(5) With ultrasonic waves applied to the electrolyte aqueous solution in the beaker of (4) above, add the toner or powder adhesive Tn little by little so that the amount added becomes 10 mg, disperse it in the electrolyte aqueous solution, and further ultrasonically disperse it for 60 seconds. When dispersing with ultrasonic waves, the water temperature in the water tank is appropriately adjusted to be 10° C. or higher and 40° C. or lower.
(6) Using a pipette, the electrolyte aqueous solution in (5) above with dispersed toner or powder adhesive Tn is added dropwise to the round bottom beaker in (1) placed in the sample stand so that the measurement concentration is adjusted to 5%. Then, the measurement is performed until the number of measured particles reaches 50000.
(7) The measurement data is analyzed by the dedicated software attached to the device to calculate the weight average particle diameter.

(Measurement of Adhesive Strength by Powder Adhesive)

In the present disclosure, when obtaining a product such as a crimped postcard as a press-bonded sheet by press-bonding the powder adhesive with the press-bonding means 32, the strength of the bonded portion, i.e., the adhesive strength, is measured as follows.

Figure 10A:
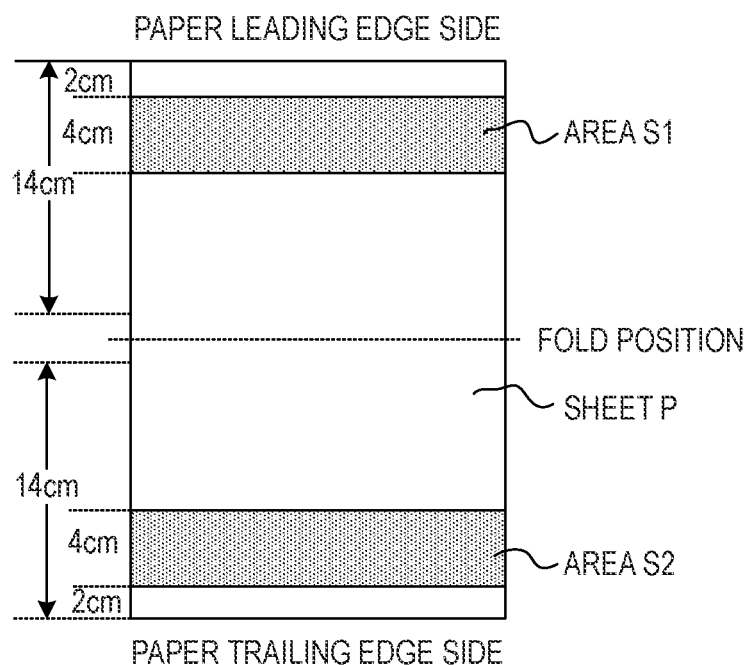
FIG. 10A is a diagram for explaining a tensile test method.
Figure 10B:
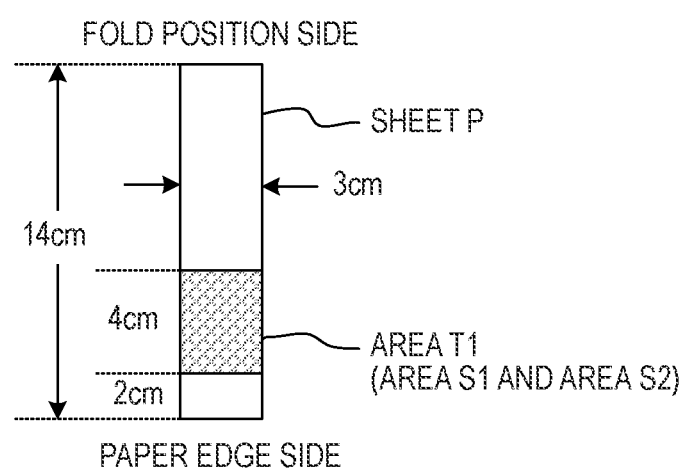
FIG. 10B is a diagram for explaining a tensile test method.
Figure 10C:
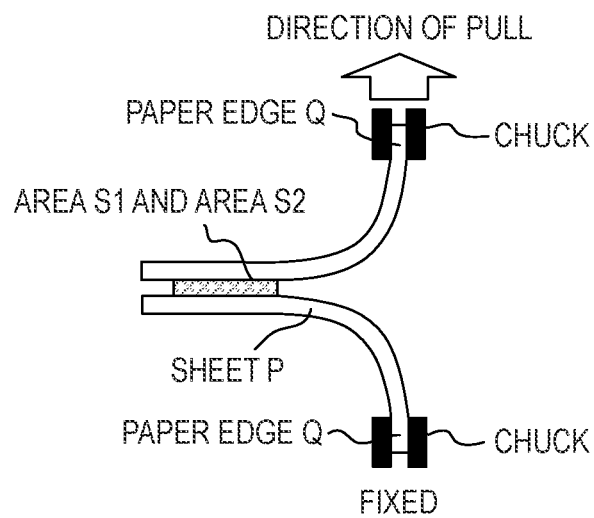
FIG. 10C is a diagram for explaining a tensile test method.

FIG. 10A shows the specifications of a sample before bonding used for measuring the adhesive strength; FIG. 10B shows a completed view of an adhesive sample; and FIG. 10C shows a method of measuring the adhesive strength. As shown in FIG. 10A, GF-C081 sold by Canon Marketing Japan Inc. is used as the sheet P. The powder adhesive Tn is printed in a 4 cm width from a position 2 cm from the leading edge in the sheet feeding direction to form a press-bonded area S1 indicated by hatched lines. Next, the powder adhesive Tn is printed in a 4 cm width from a position 2 cm from the trailing edge in the sheet feeding direction to form a press-bonded area S2 indicated by hatched lines. This is folded by the folding means 31 and press-bonded by the press-bonding means 32. The press-bonded area is denoted as adhesive layer T1. Then, as shown in FIG. 10B, it is trimmed to a width of 3 cm and a total length of 14 cm from the leading edge in the sheet feeding direction when bonded to make a sample.

As shown in FIG. 10C, the long non-bonded end Q of the paper of the sample is supported by chucks. A tensile test is performed at a tensile rate of 50 mm/min using an unillustrated RTG-1225 Tensilon universal testing machine manufactured by A&D Company, Limited to obtain a stress-strain curve.

Figure 11:
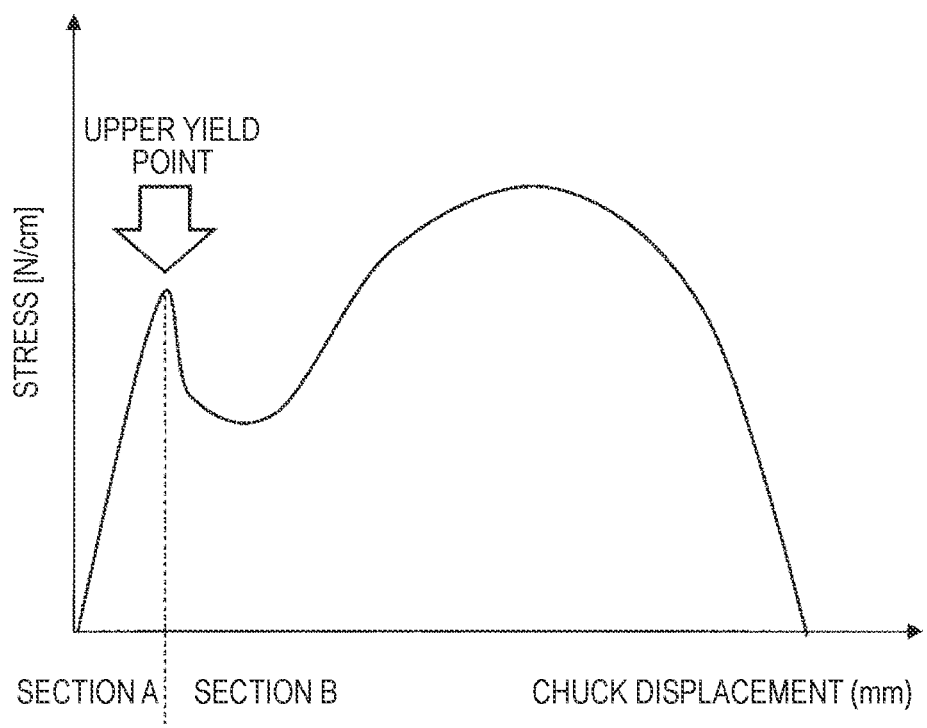
FIG. 11 is an example of a stress-strain curve graph obtained by a tensile test.

FIG. 11 shows a stress-strain curve. The horizontal axis represents the displacement of the chucks, and the vertical axis represents the tensile stress per unit sample width. The section from the displacement of 0 mm to the upper yield point is defined as section A, and the subsequent section is defined as section B. Section A is an elastic deformation region, and peeling of the press-bonded area does not occur. Therefore, if pulling is stopped, the sample can retain its original shape. On the other hand, section B is a plastic deformation region where peeling of the press-bonded area or paper breakage occurs as described later. Hereinafter, the tensile stress per unit width in the present proposal is defined as the adhesive strength. As pulling continues past the upper yield point, peeling of the adhesive portion begins to progress.

Example 1

This example shows that a press-bonded sheet P manufactured by the method of the present disclosure can be peeled smoothly and with moderate force.

Figure 12:
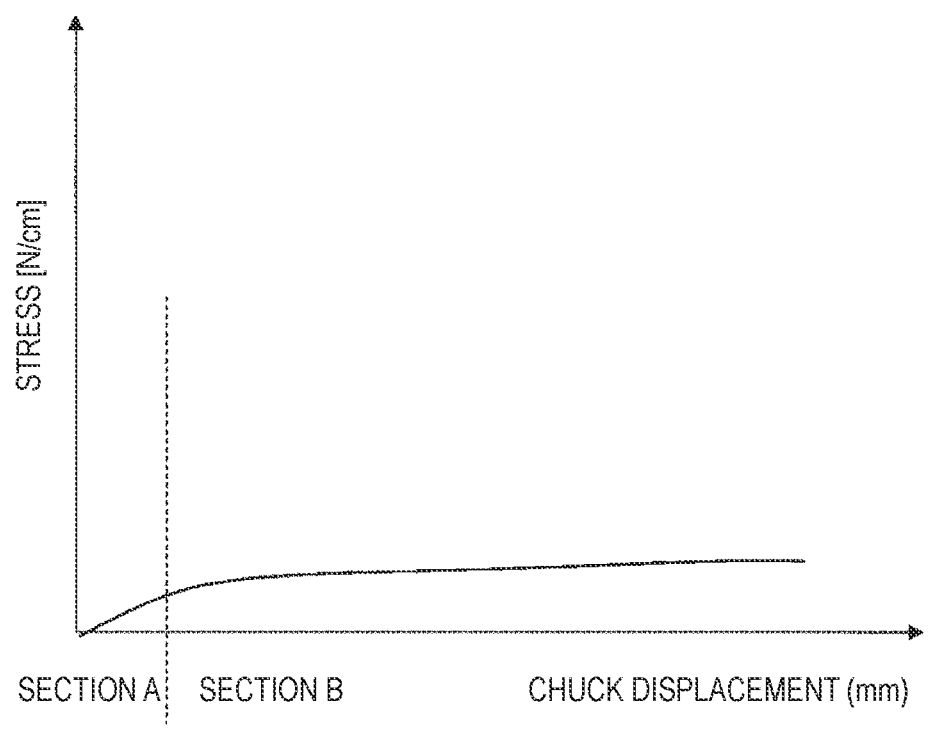
FIG. 12 is an adhesive strength evaluation result of a conventional crimped postcard.

The phrase "Peeled smoothly" means that stress fluctuation during peeling is small. In other words, it means that the adhesive strength is stable. FIG. 12 shows the evaluation result of the adhesive strength of a conventional commercially available crimped postcard as a comparative example. It can be seen that the adhesive strength in section B is stable without fluctuation. In such a state, when peeling, it can be peeled smoothly and a pleasant texture can be obtained.

Printing toner having the following composition was prepared.

(Manufacture Example of Printing Toner of Present Example)

Next, a manufacture method of printing toner Tc will be exemplified. Ty and Tm can also be manufactured similarly by changing the colorant. First, the following materials were prepared. Note that "parts" means "parts by mass."

Styrene 60.0 parts
Colorant 6.5 parts
(C.I. Pigment Blue 15:3, Manufactured by Dainichiseika Color & Chemicals Mfg. Co., Ltd.)

The above materials were charged into an Attritor (manufactured by Mitsui Miike Machinery Co., Ltd.), and further dispersed for 5 hours at 220 rpm using zirconia particles having a diameter of 1.7 mm to obtain a pigment dispersion.

In addition, the following materials were prepared.

| Styrene | 15.0 parts |
|---|---|
| n-butyl acrylate | 25.0 parts |
| Polyester resin | 4.0 parts |

(Weight Average Molecular Weight (Mw) 20,000, Glass Transition Temperature (Tg) 75° C., Acid Value 8.2 mg KOH/g)

| Behenyl behenate | 12.0 parts |
|---|---|
| Divinylbenzene | 0.5 parts |

The above materials were mixed and added to the pigment dispersion. The resulting mixture was kept at 60° C., stirred at 500 rpm using a T. K. Homomixer (manufactured by Tokushu Kika Kogyo Co., Ltd.) to uniformly dissolve and disperse, and a polymerizable monomer composition was prepared.

On the other hand, 850.0 parts of a 0.10 mol/L-$Na_3PO_4$ aqueous solution and 8.0 parts of 10% hydrochloric acid were added to a container equipped with a high-speed stirrer Clearmix (manufactured by M Technique Co., Ltd.) and the rotation speed was adjusted to 15000 rpm and heated to 70° C. To this was added 127.5 parts of a 1.0 mol/L-$CaCl_2$) aqueous solution to prepare an aqueous medium containing a calcium phosphate compound.

After charging the polymerizable monomer composition into the aqueous medium, 7.0 parts of t-butyl peroxypivalate, a polymerization initiator, was added, granulated for 10 minutes while maintaining a rotation speed of 15000 rpm, then changed the stirrer from a high speed stirrer to a propeller stirrer, refluxed at 70° C. for 5 hours, then set the liquid temperature to 85° C. and further reacted for 2 hours.

After completion of the polymerization reaction, the resulting slurry was cooled, hydrochloric acid was further added to the slurry to adjust the pH to 1.4, and stirred for 1 hour to dissolve the calcium phosphate salt. Thereafter, the slurry was washed with 3 times the amount of water, filtered, dried, classified to obtain toner particles.

Then, with respect to 100.0 parts of the toner particles, 2.0 parts of silica fine particles (number average particle diameter of primary particles: 10 nm, BET specific surface area: 170 m²/g) subjected to hydrophobic treatment with dimethyl silicone oil (20% by mass) was added as an external additive. The toner particles containing the silica fine particles were mixed using a Mitsui Henschel Mixer (manufactured by Mitsui Miike Machinery Co., Ltd.) at 3000 rpm for 15 minutes to obtain toner. The obtained printing toner had a weight average particle diameter of 6.5 μm.

On the other hand, the following samples A to E made of materials having different fracture strains were prepared as powder adhesives. Each sample was pulverized with a commercially available coffee mill, classified with a sieve, and the median particle size was adjusted to the range of 5 to 30 μm. The sample to be evaluated was housed in the powder container 104n of the image forming apparatus 1 shown in FIG. 1, and the above printing toner was housed in the powder container 104c. The above printing toner was used to form an image on the sheet P and apply the powder adhesive thereon, and a press-bonded sheet was created. The created press-bonded sheet was folded in two and press-bonded by a heating roller 32b having a surface temperature of 200° C. The stability of the adhesive strength of the adhesive layer was evaluated according to the procedure described in FIGS. 10A to 10C. In this example, the amount of the powder adhesive applied was set to 1.0 mg/cm². GF-C081 sold by Canon Marketing Japan Inc. was used as the sheet P. The results are shown in Table 1.

Sample A: Styrene-acrylic resin used for toner (average particle size about 6 μm)
Sample B: Low-density polyethylene FLO-THENE UF-20S manufactured by Sumitomo Seika Chemicals Co., Ltd. (average particle size about 20 μm)
Sample C: Low-density polyethylene SPHERICAL POWDER LE-1080 manufactured by Sumitomo Seika Chemicals Co., Ltd. (average particle size about 6 μm)
Sample D: Ethylene-acrylic acid copolymer SPHERICAL POWDER EA-209 manufactured by Sumitomo Seika Chemicals Co., Ltd. (50 mass % or more) (average particle size about 11 μm)
Sample E: Low-density polyethylene EXCELLEN FX201 manufactured by Sumitomo Chemical Co., Ltd. (average particle size about 10 μm)

Here, those with stable adhesive strength and smooth peeling feel were rated as OK. Those with unstable adhesive strength and no smooth feel when peeled were rated NG.

TABLE 1

| Sample | Fracture Strain (%) | Elastic Modulus (MPa) | Adhesive Strength Stability | Smoothness on Peeling |
|---|---|---|---|---|
| A | 5 | 3300 | NG | NG |
| B | 15 | 300 | OK | OK |
| C | 300 | 150 | OK | OK |
| D | 640 | 122 | OK | OK |
| E | 600 | 49 | OK | OK |

Figure 13:
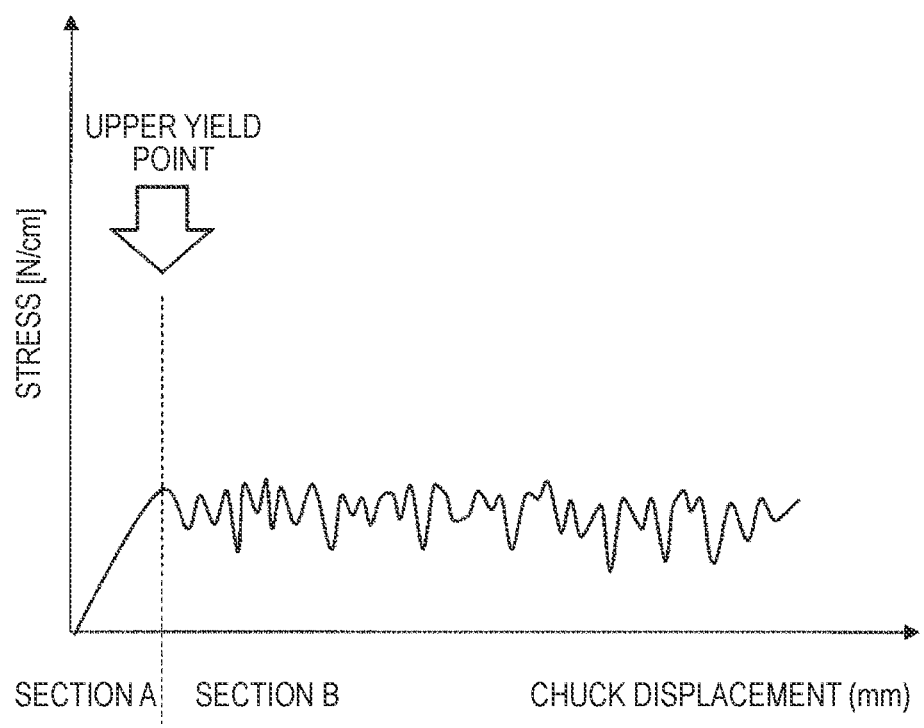
FIG. 13 is an adhesive strength evaluation result of Sample A in Example 1.
Figure 14A:
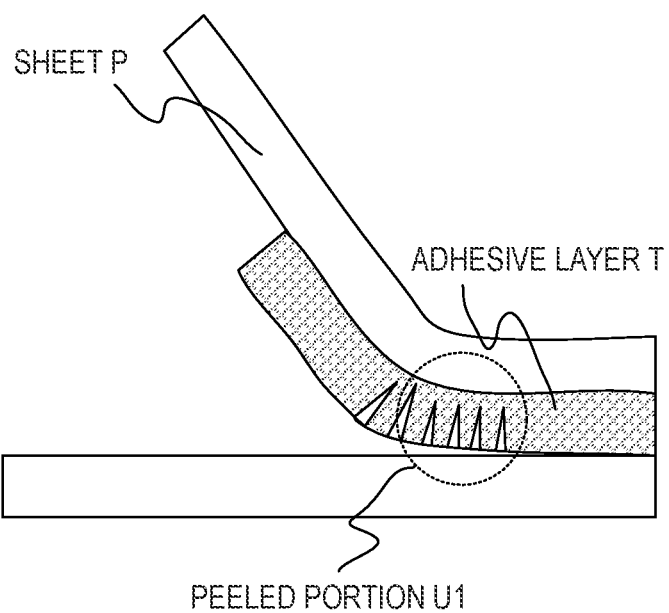
FIG. 14A is an explanatory diagram of the peeled portion of Sample A and Sample B in Example 1.

The adhesive strength measurement result of the adhesive layer formed with Sample A is shown in FIG. 13. It can be seen that there is fluctuation in the adhesive strength after section B, which is unstable. This is due to the low fracture strain. FIG. 14A shows a simulated cross section during peeling. As one side of the sheet P is lifted upward, the adhesive layer T also tries to follow the movement of the sheet P. At this time, a bending deformation stress is applied to the adhesive layer T at the peeled portion U1. Since sample A has a small fracture strain of the adhesive layer T, it cannot deform following the sheet P and is destroyed. Therefore, the adhesive strength varies discontinuously. As a result, the feel during peeling is different from that of conventional crimped postcards.

Figure 14B:
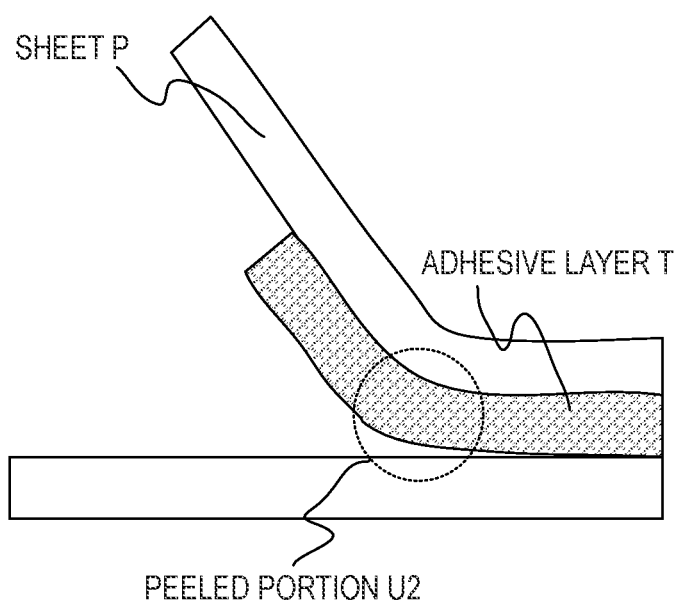
FIG. 14B is an explanatory diagram of the peeled portion of Sample A and Sample B in Example 1.
Figure 15:
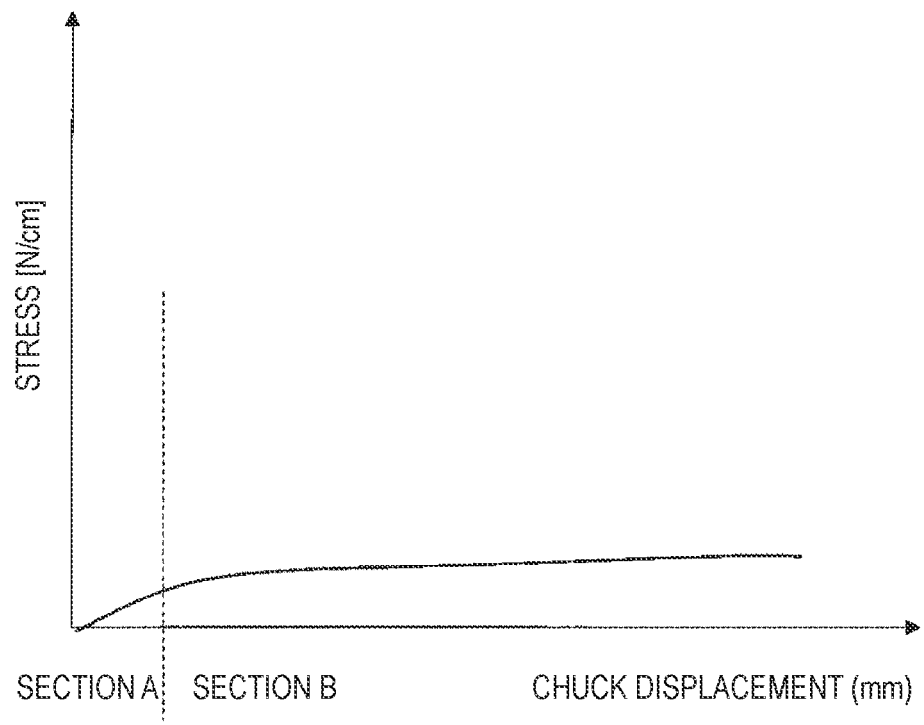
FIG. 15 is an adhesive strength evaluation result of Sample B in Example 1.

The adhesive strength measurement result of the adhesive layer formed with sample B is shown in FIG. 15. It can be seen that there is little fluctuation in adhesive strength after section B, which is stable. This is due to the high fracture strain. FIG. 14B shows a simulated cross section during peeling. As one side of the sheet P is lifted upward, the adhesive layer T also tries to follow the movement of the sheet. Although a bending deformation stress is applied to the adhesive layer T at the peeled portion U2, since the adhesive layer T using sample B has a large fracture strain, it continuously peels while deforming following the sheet. Thus, stable peeling can be achieved regardless of the chuck displacement in section B. The adhesive layers T using samples C, D, and E showed similar results. That is, by having a high fracture strain of the adhesive layer T, destruction of the peeled portion U2 during peeling can be suppressed to achieve stable peeling.

It has been described that smoothness during peeling can be achieved by the high fracture strain of the adhesive layer, but if the fracture strain is too high, there is a risk that the adhesive layer may stretch and fail to peel from the sheet during peeling. Therefore, it is undesirable for the fracture strain of the powder adhesive Tn as the material of the adhesive layer to be too high.

An appropriate force during peeling means that the average adhesive strength in section B is desirably 0.2 N/cm or more and 1.0 N/cm or less. If the adhesive strength is low, unintended peeling may occur during transportation, and if it is high, force will be required during peeling, increasing the risk of the sheet itself tearing. The adhesive strength of the adhesive layer can be appropriately adjusted by the amount of the powder adhesive Tn applied and the amount of heat and pressure during press-bonding.

By setting the fracture strain of the main constituent material of the powder adhesive Tn to 10% or more and less than 1000%, a product manufactured by a press-bonding process can be peeled smoothly.

Example 2

This example verifies the decrease in adhesive strength due to sheet deformation after press-bonding of the press-bonded sheet manufactured by the method of the present disclosure.

Figure 16A:
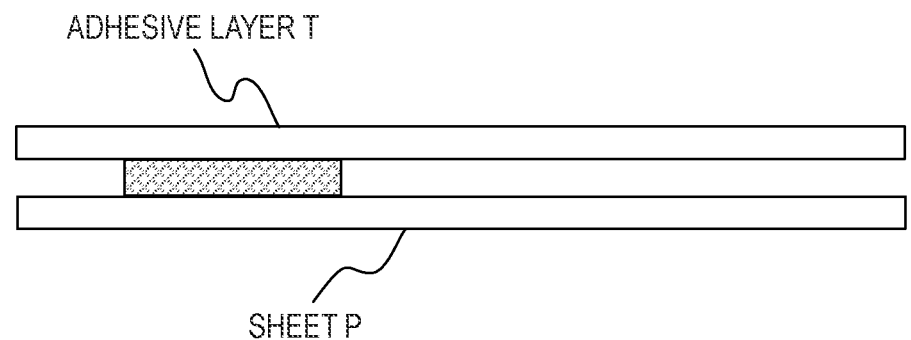
FIG. 16A is an explanatory diagram of a deformation test.
Figure 16B:
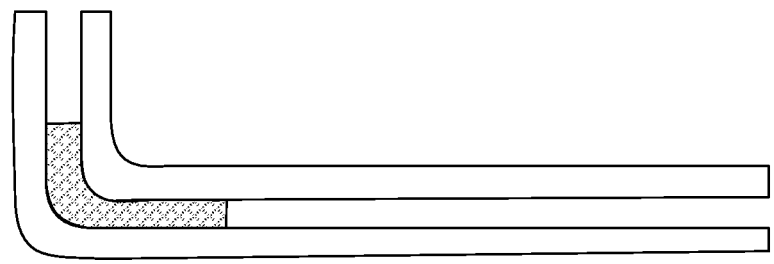
FIG. 16B is an explanatory diagram of a deformation test.
Figure 16C:
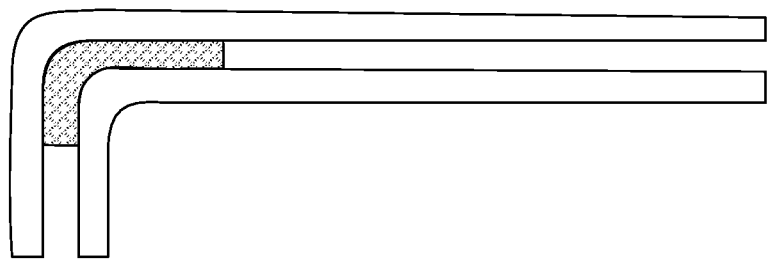
FIG. 16C is an explanatory diagram of a deformation test.

A sheet created by performing a press-bonding process as shown in FIG. 16A was prepared, and the adhesive strength of the sheet folded at 90 degrees up and down 10 times as shown in FIGS. 16B and 16C was measured. Press-bonded sheets having adhesive layers with different fracture strains were prepared, and the evaluation results of the adhesive strengths are shown in Table 2. Cases where no decrease in adhesive strength occurred were rated as OK, and cases where a decrease occurred were rated NG.

TABLE 2

| Sample | Fracture Strain (%) | Elastic Modulus (MPa) | Decrease in Adhesive Strength |
|---|---|---|---|
| A | 5 | 3300 | NG |
| B | 15 | 300 | OK |
| C | 300 | 150 | OK |
| D | 640 | 122 | OK |
| E | 600 | 49 | OK |

Figure 17:
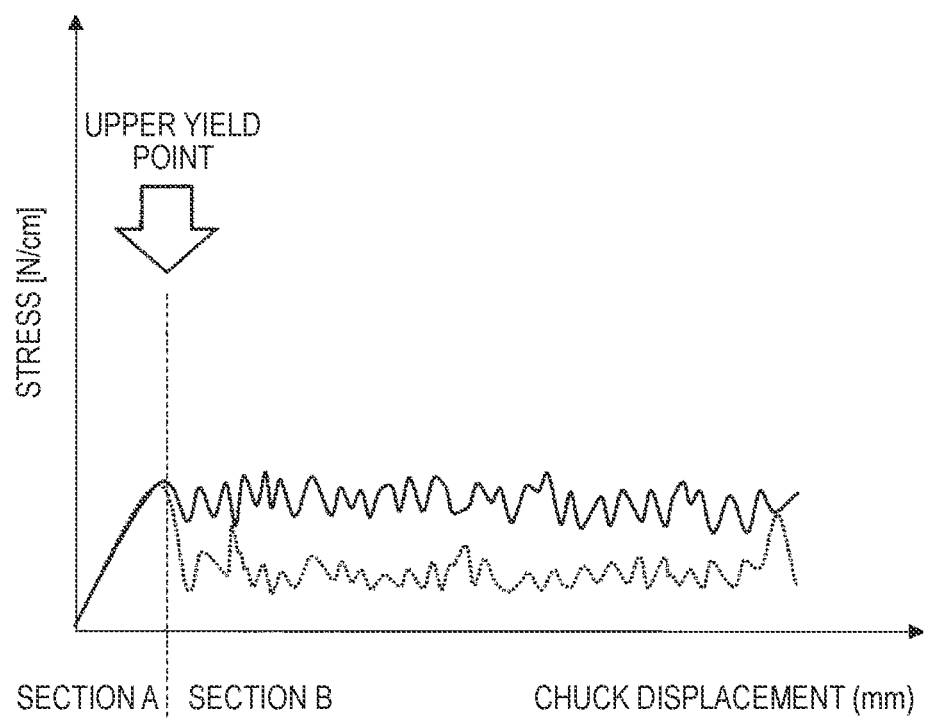
FIG. 17 is an adhesive strength evaluation result before and after the deformation test on Sample A in Example 2.

FIG. 17 shows the adhesive strength measurement results of the press-bonded sheet manufactured using Sample A, where the solid line is before folding and the broken line is after folding. In the case of using Sample A, there is a difference in the adhesive strength in section B before and after folding, and it can be seen that the adhesive strength decreased after folding. This is because the fracture strains of the adhesive layers in regions S1 and S2 are low, so that destruction of the adhesive layers occurred when deformation due to folding occurred. Therefore, it is considered that the adhesive strength decreased after folding.

Figure 18:
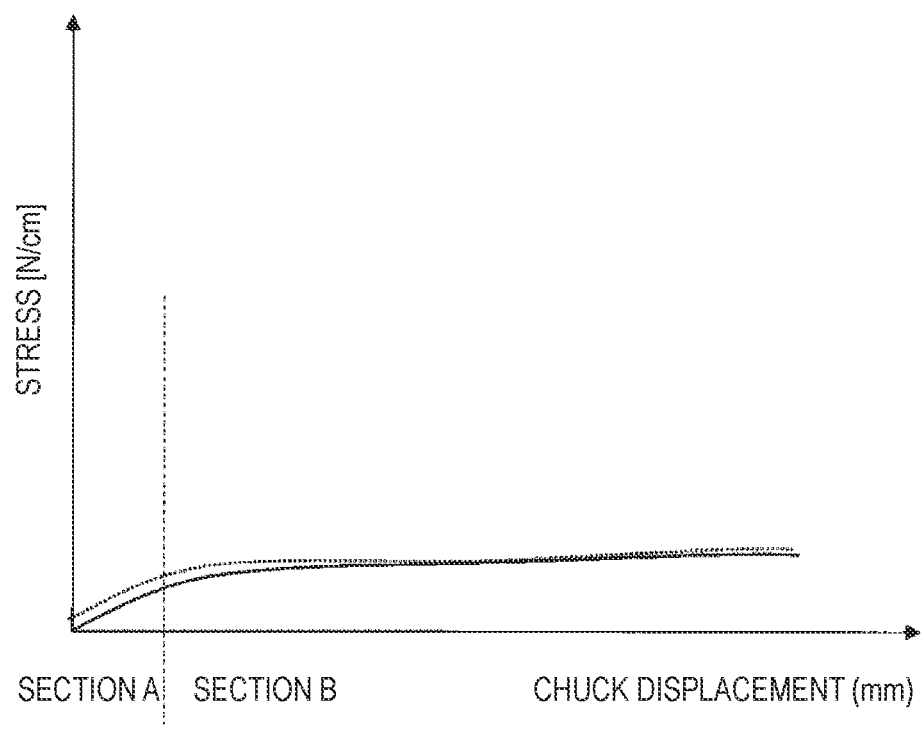
FIG. 18 is an adhesive strength evaluation result before and after the deformation test on Sample B in Example 2.

FIG. 18 shows the adhesive strength measurement results of the press-bonded sheet manufactured using Sample B, where the solid line is before folding and the broken line is after folding. In Sample B, it was confirmed that there was almost no difference in adhesive strength in section B before and after folding. This is because the fracture strains of the adhesive layers in regions S1 and S2 are high, so that destruction of the adhesive layers did not occur even when deformation due to folding occurred. Therefore, it is considered that there was no decrease in adhesive strength after folding. Samples C, D, and E showed the same results.

As described above, by setting the fracture strain of the main constituent material of the powder adhesive Tn to 10% or more and less than 1000%, a product manufactured by a press-bonding process can be peeled smoothly and with moderate force, and lowering of adhesive strength due to deformation of the product can be suppressed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A method for manufacturing a press-bonded sheet in which sheet portions are press-bonded in a peelable state, comprising:
    a step of forming an adhesive layer containing powder adhesive on a sheet;
    a fixing step of heating the adhesive layer formed on the sheet to fix it to the sheet;
    a step of superimposing by opposing an area on the sheet where the adhesive layer is formed and fixed and an area on the same sheet or on a different sheet where another adhesive layer is formed and fixed; and
    a press-bonding step of pressurizing the superimposed portion of the areas where the adhesive layer has been formed and fixed under heating and press-bonding it,
    wherein a fracture strain of a main constituent material of the powder adhesive is 10% or more and less than 1000%.

2. The method for manufacturing a press-bonded sheet according to claim 1, wherein a main constituent material of the powder adhesive is at least one selected from the group consisting of polyester resins, vinyl-based resins, acrylic resins, styrene-acrylic resins, polyethylene, polypropylene, polyolefins, ethylene-vinyl acetate copolymer resins, and ethylene-acrylic acid copolymer resins.

3. The method for manufacturing a press-bonded sheet according to claim 1, wherein the main constituent material of the powder adhesive is low-density polyethylene.

4. The method for manufacturing a press-bonded sheet according to claim 1, wherein an elastic modulus of the main constituent material of the powder adhesive is 1.0 GPa or less.

5. A press-bonded sheet manufacturing apparatus for manufacturing a press-bonded sheet in which sheet portions are press-bonded in a peelable state, comprising:
    means for forming an adhesive layer containing powder adhesive on a sheet;
    fixing means for heating the adhesive layer formed on the sheet to fix it to the sheet;
    means for superimposing by opposing an area on the sheet where the adhesive layer is formed and fixed and an area on the same sheet or on a different sheet where another adhesive layer is formed and fixed; and
    press-bonding means for pressurizing the superimposed portion of the areas where the adhesive layer has been formed and fixed under heating and press-bonding it,
    wherein a fracture strain of a main constituent material of the powder adhesive is 10% or more and less than 1000%.

6. The press-bonded sheet manufacturing apparatus according to claim 5, wherein a main constituent material of the powder adhesive is at least one selected from the group consisting of polyester resins, vinyl-based resins, acrylic resins, styrene-acrylic resins, polyethylene, polypropylene, polyolefins, ethylene-vinyl acetate copolymer resins, and ethylene-acrylic acid copolymer resins.

7. The press-bonded sheet manufacturing apparatus according to claim 5, wherein the main constituent material of the powder adhesive is low-density polyethylene.

8. The press-bonded sheet manufacturing apparatus according to claim 5, wherein an elastic modulus of the main constituent material of the powder adhesive is 1.0 GPa or less.

9. An image forming apparatus for manufacturing a press-bonded sheet in which sheet portions are press-bonded in a peelable state, comprising:
    means for forming a toner image on a sheet using printing toner;
    means for forming an adhesive layer containing powder adhesive on the sheet;
    fixing means for heating the toner image and the adhesive layer formed on the sheet to fix them to the sheet;
    means for superimposing by opposing an area on the sheet where the adhesive layer is formed and fixed and an area on the same sheet or on a different sheet where another adhesive layer is formed and fixed; and
    press-bonding means for pressurizing the superimposed portion of the areas where the adhesive layer has been formed and fixed under heating and press-bonding it, wherein a fracture strain of a main constituent material of the powder adhesive is 10% or more and less than 1000%.

10. The image forming apparatus according to claim 9, wherein a main constituent material of the powder adhesive is at least one selected from the group consisting of polyester resins, vinyl-based resins, acrylic resins, styrene-acrylic resins, polyethylene, polypropylene, polyolefins, ethylene-vinyl acetate copolymer resins, and ethylene-acrylic acid copolymer resins.

11. The image forming apparatus according to claim 9, wherein the main constituent material of the powder adhesive is low-density polyethylene.

12. The image forming apparatus according to claim 9, wherein an elastic modulus of the main constituent material of the powder adhesive is 1.0 GPa or less.

* * * * *